(12) United States Patent
Thubert et al.

(10) Patent No.: US 10,587,501 B2
(45) Date of Patent: Mar. 10, 2020

(54) EMERGENCY PACKET TRANSMISSION ALLOCATION WITHIN TIME MULTIPLEXED CHANNEL HOPPING FOR LLNS

(71) Applicant: Cisco Technology, Inc., San Jose, CA (US)

(72) Inventors: Pascal Thubert, La Colle sur Loup (FR); Huimin She, Shanghai (CN); Feiliang Wang, Shanghai (CN); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 100 days.

(21) Appl. No.: 15/986,934

(22) Filed: May 23, 2018

(65) Prior Publication Data

US 2019/0363976 A1 Nov. 28, 2019

(51) Int. Cl.
| H04L 12/725 | (2013.01) |
| H04L 12/841 | (2013.01) |
| H04L 12/751 | (2013.01) |

(52) U.S. Cl.
CPC ........... *H04L 45/306* (2013.01); *H04L 45/02* (2013.01); *H04L 47/283* (2013.01)

(58) Field of Classification Search
CPC ...... H04L 45/306; H04L 45/02; H04L 47/283
USPC ........................................ 370/431, 442, 443
See application file for complete search history.

(56) References Cited

U.S. PATENT DOCUMENTS

| 8,842,630 B2 | 9/2014 | Shaffer et al. |
| 9,485,157 B2 | 11/2016 | Thubert et al. |
| 9,510,362 B2 | 11/2016 | Hui et al. |
| 2003/0067906 A1* | 4/2003 | Young .................. H04B 7/2656 |
| | | 370/347 |

(Continued)

OTHER PUBLICATIONS

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

(Continued)

*Primary Examiner* — Obaidul Huq
(74) *Attorney, Agent, or Firm* — Leon R. Turkevich

(57) ABSTRACT

A network device establishes a depth-aware communication schedule for one or more nodes in a data network having a routing topology comprising a root node, the establishing including selecting from a slotframe of the depth-aware communication schedule a first subset of timeslots based on the depth, and allocating to each timeslot in the first subset an exclusive role (a transmit operation, a receive operation, or an idle state) for one or more of the nodes at the corresponding depth; the network device identifies one or more idle states in the depth-aware communication schedule, and selects a second subset of timeslots from the idle states as in-case-of-emergency timeslots, based on the network device identifying in the second subset a corresponding timeslot at a neighboring depth being allocated a corresponding transmit operation or receive operation; the network device causes selective transmission of a prioritized data packet in an allocated in-case-of-emergency timeslot.

20 Claims, 24 Drawing Sheets

(56) References Cited

U.S. PATENT DOCUMENTS

| | | | | |
|---|---|---|---|---|
| 2006/0268908 | A1* | 11/2006 | Wang | H04L 41/046 370/401 |
| 2015/0327261 | A1* | 11/2015 | Thubert | H04W 40/22 370/336 |
| 2015/0373735 | A1 | 12/2015 | Thubert et al. | |
| 2016/0044621 | A1 | 2/2016 | Ding et al. | |
| 2016/0212729 | A1* | 7/2016 | Bulten | H04W 72/048 |
| 2017/0257138 | A1 | 9/2017 | Shih et al. | |
| 2018/0020447 | A1 | 1/2018 | Thubert et al. | |
| 2018/0054380 | A1 | 2/2018 | Jin | |

OTHER PUBLICATIONS

Dao et al., "Securing Heterogeneous IoT with Intelligent DDoS Attack Behavior Learning", [online], Nov. 16, 2017, [retrieved on May 1, 2018]. Retrieved from the Internet: URL: <https://www.google.com/url?sa=t&rct=j&q=&esrc=s&source=web&cd=2&ved=0ahUKEwiG8vv4z17aAhWW3oMKHf4FCigQFgg0MAE&url=https%3A%2F%2Fpdfs.semanticscholar.org%2Fce86%2Fe6ea4dbce7bb6eebf78cb47424ccb929ffd1.pdf&usg=AOvVaw33qNmak5kovY7UnnhtlkWK>, pp. 1-7.

Wang, Ed., et al., "6top Protocol (6P)", [online], 6TiSCH Internet-Draft, Mar. 30, 2018, [retrieved on May 16, 2018]. Retrieved from the Internet: URL: <https://tools.ietf.org/pdf/draft-ietf-6tisch-6top-protocol-11.pdf>, pp. 1-45.

Vilajosana, Ed., et al., "Minimal 6TiSCH Configuration", draft-ietf-6tisch-minimal-21, 6TiSCH Internet Draft, [online] Feb. 2, 2017, [retrieved on May 9, 2018]. Retrieved from the Internet: URL: <https://tools.ietf.org/pdf/draft-etf-6tisch-minimal-21.pdf>, pp. 1-27.

Lee et al., "Priority-based Scheduling using Best Channel in 6TiSCH Networks", [online] Sep. 21, 2017, [retrieved on Apr. 13, 2018]. Retrieved from the Internet: <http://ir.lib.cyut.edu.tw:8080/bitstream/310901800/33621/2/ClusterComputing-final_%E4%B8%8A%E5%82%B3%E6%95%B8%E4%BD%8D%E5%85%B8%E8%97%8F.pdf>, pp. 1-14.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Vasseur Ed., et al., "Routing Metrics Used for Path Calculation in Low-Power and Lossy Networks", Internet Engineering Task Force (IETF), Request for Comments: 6551, Mar. 2012, pp. 1-30.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Gnawali et al., "The Minimum Rank with Hysteresis Objective Function", Internet Engineering Task Force (IETF), Request for Comments: 6719, Sep. 2012, pp. 1-13.

Vilajosana, Ed., et al., "Minimal IPv6 over the TSCH Mode of IEEE 802.15.4e (6TiSCH) Configuration", Internet Engineering Task Force (IETF), Request for Comments: 8180, May 2017, pp. 1-28.

Tia, "TR51 | Smart Utility Networks", [online], [retrieved on May 16, 2018]. Retrieved from the Internet: URL: <http://www.tiaonline.org/all-standards/committees/tr-51>, pp. 1-2.

Vijayasankar et al., "Frequency hopping for long-range IoT networks", [online], Texas Instruments, Jul. 2016 [retrieved on May 22, 2018]. Retrieved from the Internet: URL: <http://www.ti.com/lit/wp/swry025/swry025.pdf>, pp. 1-8.

Heile et al., "Wi-SUN FAN Overview", draft-heile-lpwan-wisun-overview-00, [online], Ipwan Internet Draft, Jul. 3, 2017, [retrieved on May 22, 2018]. Retrieved from the Internet: URL: <https://tools.ietf.org/pdf/draft-heile-lpwan-wisun-overview-00.pdf>, pp. 1-15.

Duquennoy, Ed., "6TiSCH Autonomous Scheduling Function (ASF)", draft-duquennoy-6tisch-asf-01, 6TiSCH Internet Draft, Mar. 1, 2018, [retrieved on May 22, 2018]. Retrieved from the Internet: URL: <https://tools.ietf.org/pdf/draft-duquennoy-6tisch-asf-01.pdf>, pp. 1-14.

Hahm et al., "Designing Time Slotted Channel Hopping and Information-Centric Networking for IoT", [online], Nov. 28, 2016, [retrieved on May 22, 2018]. Retrieved from the Internet: URL: <https://hal.inria.fr/hal-01404318/document>, 6 pages.

Mavromatis et al., "Impact of Guard Time Length on IEEE 802.15.4e TSCH Energy Consumption", University of Bristol [online], [retrieved on May 22, 2018]. Retrieved from the Internet: URL: <http://georgiospapadopoulos.com/docs/poster/ieeesecon2016-poster.pdf>, 1 page.

Thubert et al., U.S. Appl. No. 15/962,053, filed Apr. 25, 2018.

* cited by examiner

EMERGENCY PACKET TRANSMISSION ALLOCATION WITHIN TIME MULTIPLEXED CHANNEL HOPPING FOR LLNS

TECHNICAL FIELD

The present disclosure relates generally to computer networks, and, more particularly, to time multiplexed channel hopping for Low-power and Lossy Networks (LLNs).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

Channel hopping is a communication mechanism often employed in LLNs that entails varying channel between transmissions in a pseudo random fashion, to benefit from multiple channels in parallel and improve throughput. In general, channel hopping uses a pseudo-random sequence known to both transmitter and receiver. Compared with fixed frequency transmissions, channel hopping reduces the impact of loss on a particular channel due to uncontrolled external interference or multipath fading on that particular channel.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
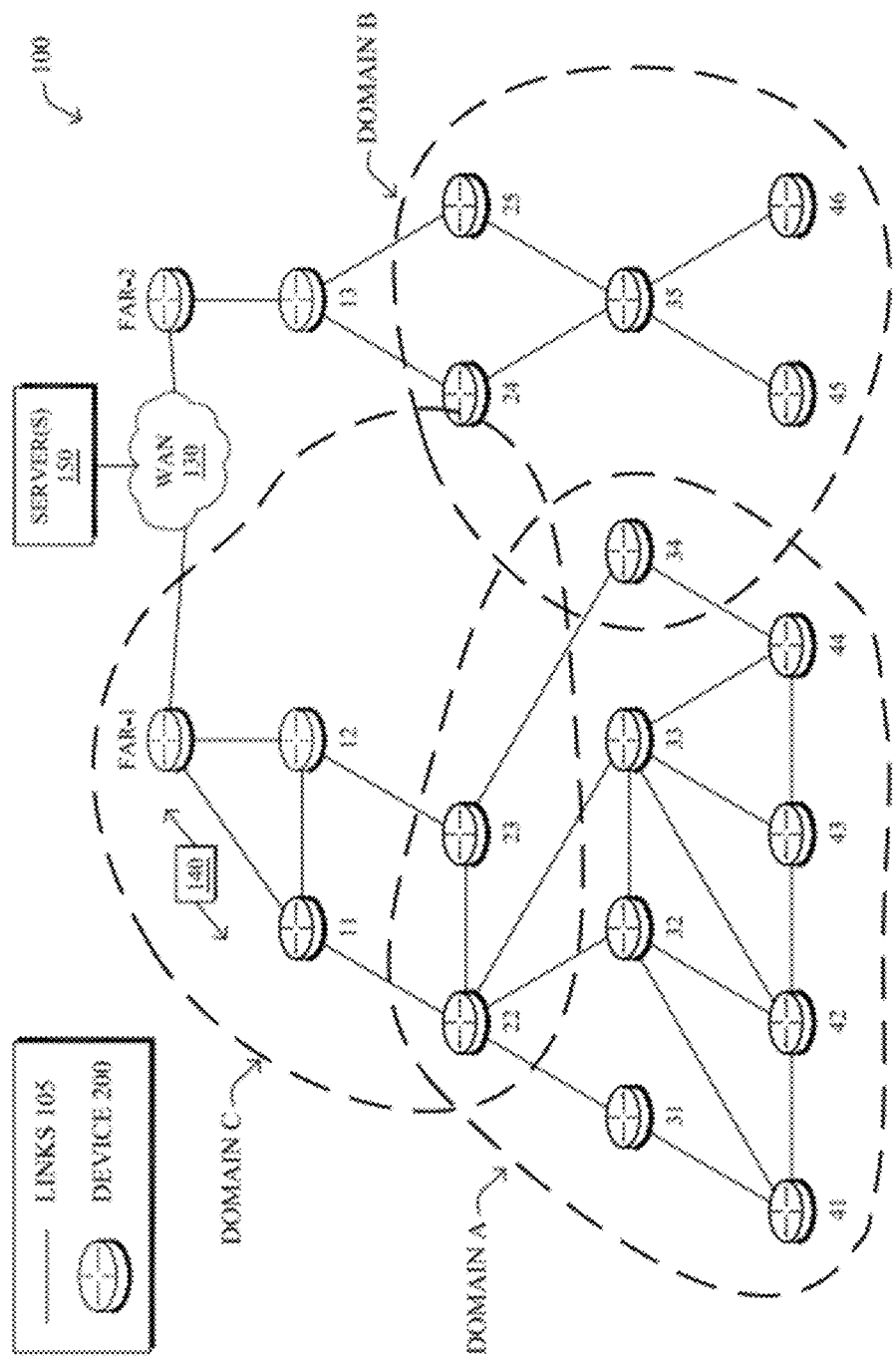
FIG. 1 illustrates an example communication network.

In one embodiment, a method comprises establishing, by a network device, a depth-aware communication schedule for one or more nodes in a data network having a routing topology comprising a root node and each node in the routing topology having an associated depth relative to the root node, the establishing including selecting from a slotframe of the depth-aware communication schedule a first subset of timeslots based on the depth of a particular node, and allocating to each timeslot in the first subset an exclusive role for one or more of the nodes at the corresponding depth, the exclusive role including one of a transmit operation, a receive operation, or an idle state; identifying, by the network device, one or more of the idle states in the depth-aware communication schedule; selecting, by the network device, a second subset of timeslots from the one or more idle states as in-case-of-emergency timeslots, based on the network device identifying for each of the timeslots in the second subset a corresponding timeslot at a neighboring depth being allocated a corresponding transmit operation or receive operation; and causing, by the network device, selective transmission of a prioritized data packet in an allocated in-case-of-emergency timeslot.

In another embodiment, an apparatus comprises a processor circuit and a device interface circuit. The processor circuit is configured for establishing a depth-aware communication schedule for one or more nodes in a data network having a routing topology comprising a root node and each node in the routing topology having an associated depth relative to the root node. The processor circuit further is configured for selecting from a slotframe of the depth-aware communication schedule a first subset of timeslots based on the depth of a particular node. The processor circuit further is configured for allocating to each timeslot in the first subset an exclusive role for one or more of the nodes at the corresponding depth, the exclusive role including one of a transmit operation, a receive operation, or an idle state. The processor circuit further is configured for identifying one or more of the idle states in the depth-aware communication schedule, and selecting a second subset of timeslots from the one or more idle states as in-case-of-emergency timeslots, based on the processor circuit identifying for each of the timeslots in the second subset a corresponding timeslot at a neighboring depth being allocated a corresponding transmit operation or receive operation. The device interface circuit is configured for causing selective transmission of a prioritized data packet in an allocated in-case-of-emergency timeslot.

In another embodiment, one or more non-transitory tangible media are encoded with logic for execution by a machine and when executed by the machine operable for: establishing, by the machine implemented as a network device, a depth-aware communication schedule for one or more nodes in a data network having a routing topology comprising a root node and each node in the routing topology having an associated depth relative to the root node, the establishing including selecting from a slotframe of the depth-aware communication schedule a first subset of timeslots based on the depth of a particular node, and allocating to each timeslot in the first subset an exclusive role for one or more of the nodes at the corresponding depth, the exclusive role including one of a transmit operation, a receive operation, or an idle state; identifying, by the network device, one or more of the idle states in the depth-aware communication schedule; selecting, by the network device, a second subset of timeslots from the one or more idle states as in-case-of-emergency timeslots, based on the network device identifying for each of the timeslots in the second subset a corresponding timeslot at a neighboring depth being allocated a corresponding transmit operation or receive operation; and causing, by the network device, selective transmission of a prioritized data packet in an allocated in-case-of-emergency timeslot.

DETAILED DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer data network 100 illustratively comprising nodes/devices 200 (e.g., labeled as shown, "FAR-1," 'FAR-2," and "11," "12," . . . "46," and described in FIG. 2 below) The data network 100 can include root network devices (e.g., "FAR-1", "13"), and non-root network devices (e.g. "11", "12", "22" through "46"). The network nodes/devices 200 are interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the network devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guarantee the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
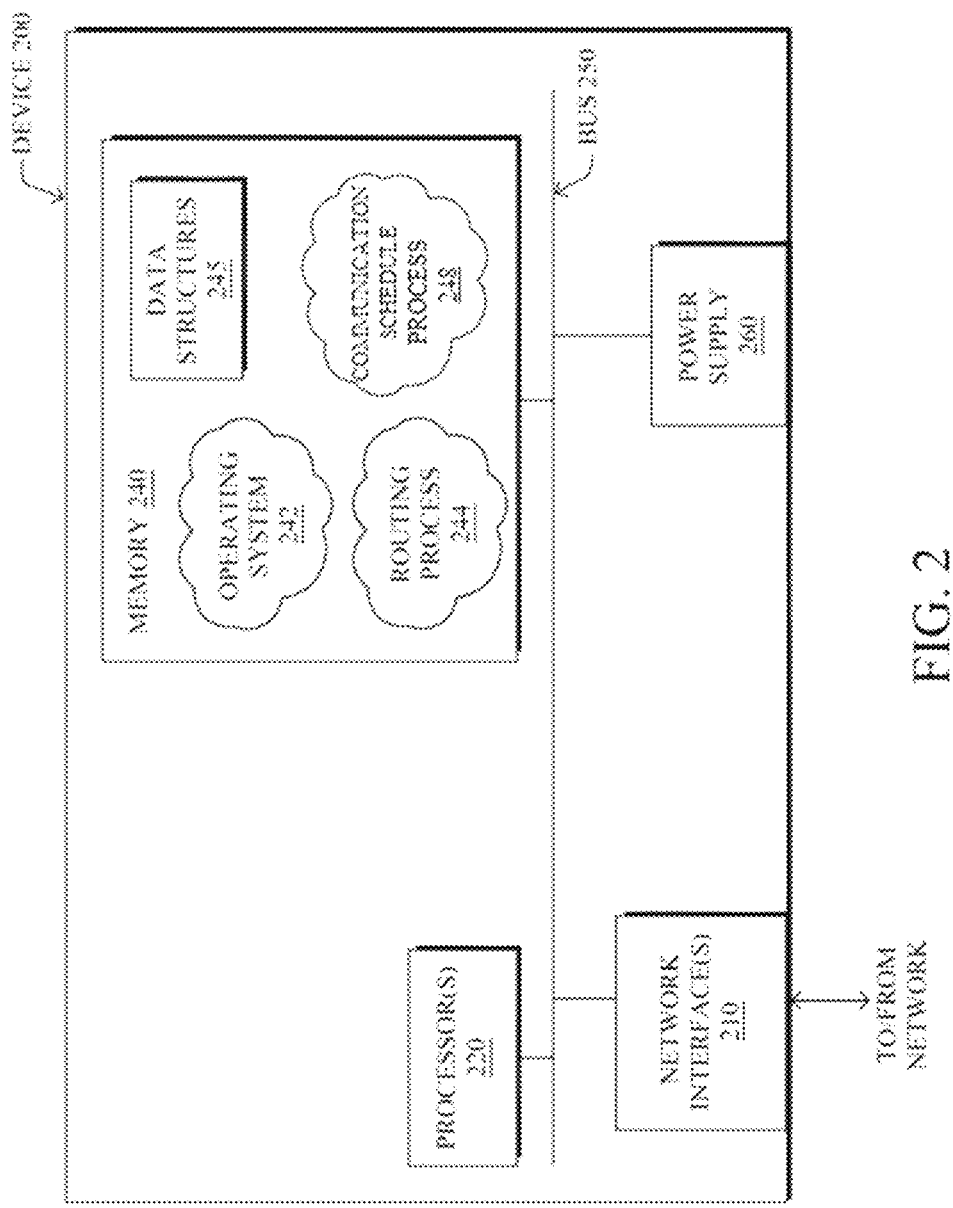
FIG. 2 illustrates an example network device/node.

FIG. 2 is a schematic block diagram of an example network node/network device 200 that may be used with one or more embodiments described herein, e.g., as any of the nodes shown in FIG. 1 above. The network device 200 may comprise one or more network interface circuits 210 (e.g., wired, wireless, PLC, etc.), at least one processor circuit 220, and a memory circuit 240 interconnected by a system bus 250, as well as a power supply circuit 260 (e.g., battery, plug-in, etc.).

The network interface circuit (s) 210, e.g., transceivers, include the mechanical, electrical, and signaling circuitry for communicating data over links 105 coupled to the network 100. The network interface circuits (also referred to herein as device interface circuits) 210 may be configured to transmit and/or receive data using a variety of different communication protocols, particularly for frequency-hopping communication as described herein. The term "configured for" or "configured to" as used herein with respect to a specified operation refers to a network device and/or machine that is physically constructed and arranged to perform the specified operation. Note, further, that the nodes may have two different types of network connections 105, e.g., wireless and wired/physical connections, and that the view herein is merely for illustration. Also, while the network interface circuit 210 is shown separately from power supply 260, for PLC the network interface circuit 210 may communicate through the power supply 260, or may be an integral component of the power supply. In some specific configurations the PLC signal may be coupled to the power line feeding into the power supply.

The memory circuit 240 includes a plurality of storage locations that are addressable by the processor circuit 220 and the network interfaces 210 for storing software programs and data structures associated with the embodiments described herein. Note that certain devices may have limited memory capacity or no memory capacity (e.g., no available memory for storage other than for programs/processes operating on the network device and associated caches). The processor circuit 220 may include hardware elements or hardware logic configured to execute the software programs and manipulate the data structures 245. An operating system 242, portions of which are typically resident in memory circuit 240 and executed by the processor circuit, functionally organizes the network device 200 by, inter alia, invoking operations in support of software processes and/or services executing on the network device 200. These software processes and/or services may include routing process/services 244, and an illustrative communication schedule process 248 as described in greater detail below. Note that while processes 244,248 are shown in centralized memory circuit 240, alternative embodiments provide for either or both of processes 244,248 to be operated within the network interfaces 210.

Any of the disclosed circuits can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 240) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 240 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 240 can be implemented dynamically by the processor circuit 220, for example based on memory address assignment and partitioning executed by the processor circuit 220.

It will be apparent to those skilled in the art that other processor circuit and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Further, the operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Routing process (services) 244 includes instructions executable by processor circuit 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc.

Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low-power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which is may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multi-point-to-point (MP2P) traffic from devices inside the LLN towards a central control point (e.g., LLN Border Routers (LBRs) or "root nodes/devices" generally), as well as point-to-multipoint (P2MP) traffic from the central control point to the network devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the network devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the network devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a network device 200 that can forward as well as generate traffic, while a "host" refers to a network device 200 that can generate but does not forward traffic. Also, a "leaf" may be used to generally describe a non-router that is connected to a DAG by one or more routers, but cannot itself forward traffic received on the DAG to another router on the DAG. Control messages may be transmitted among the network devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes.

Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
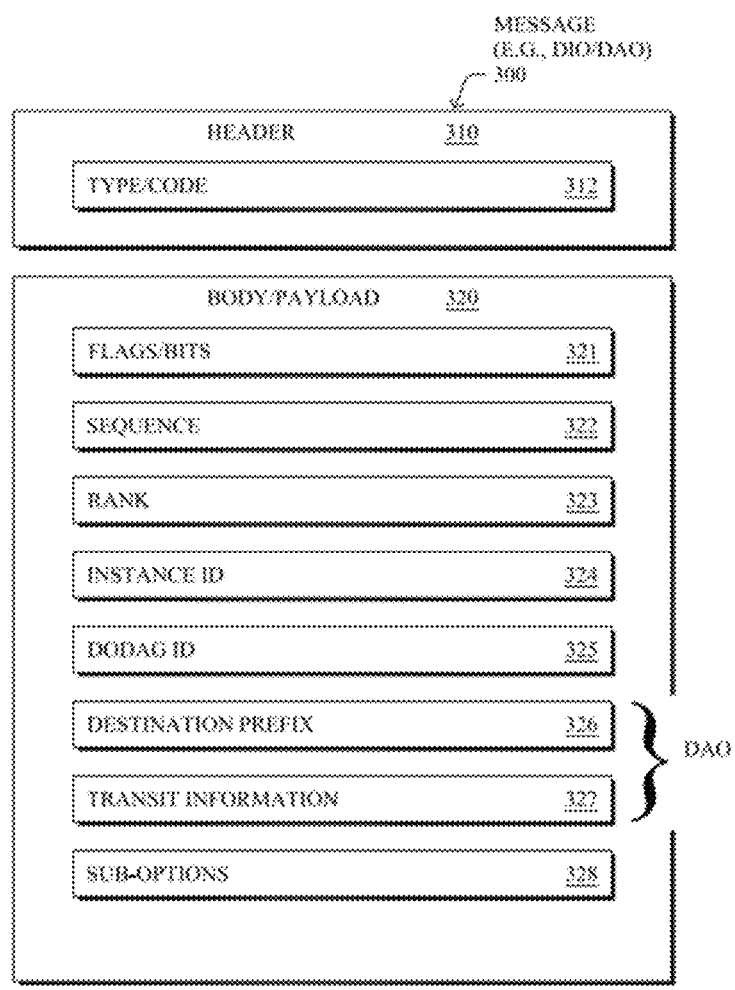
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
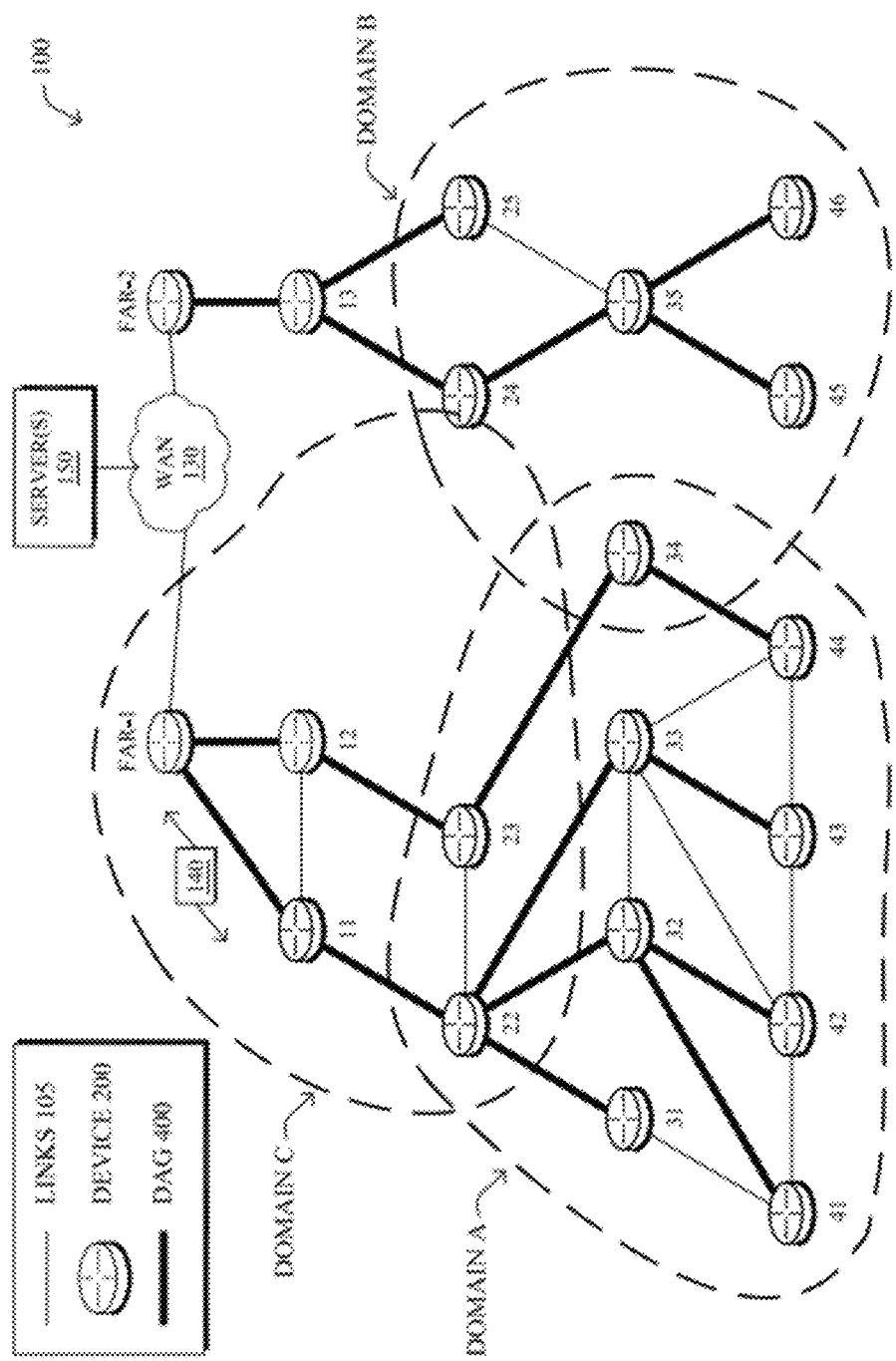
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled media access control (MAC) protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
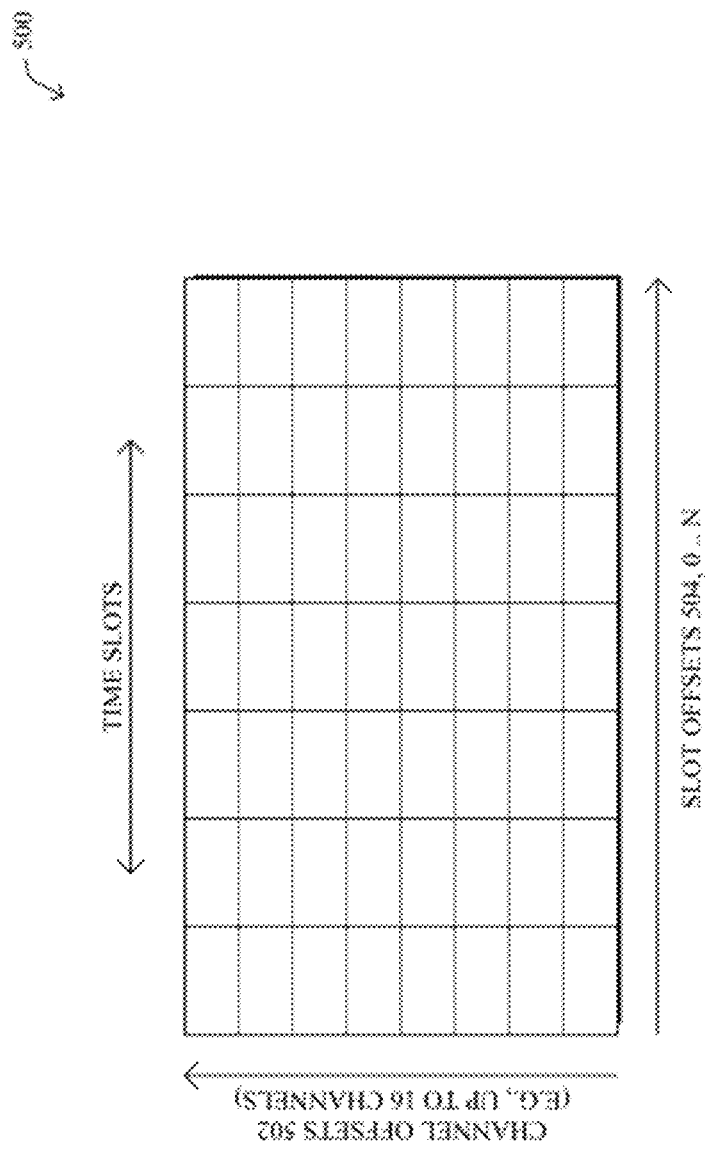
FIG. 5 illustrates an example channel distribution/usage (CDU) matrix.

Referring now to FIG. 5, an example channel distribution/ usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
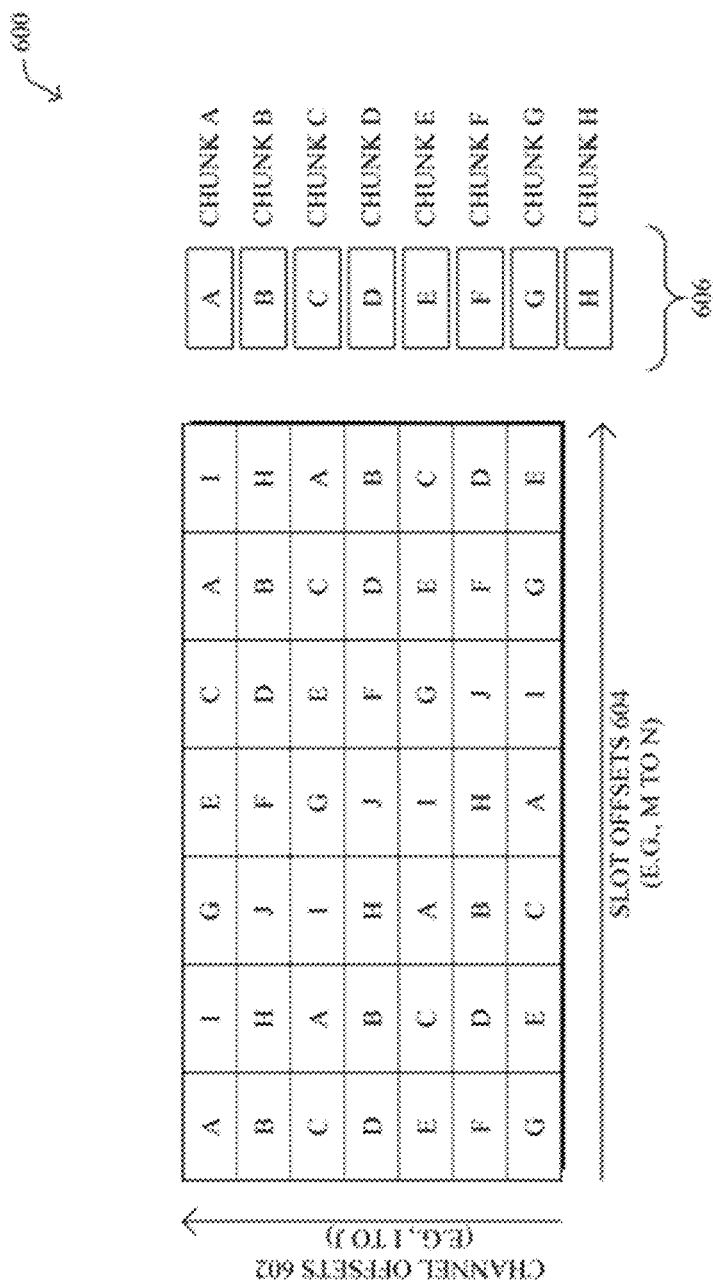
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a network device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times.

Typically, the effective channel for a given transmission may be incremented by a constant that is prime with the number of channels, modulo the number of channels at each iteration. As a result, the channel of a given transmission changes at each iteration and the matrix virtually rotates.

Figure 7:
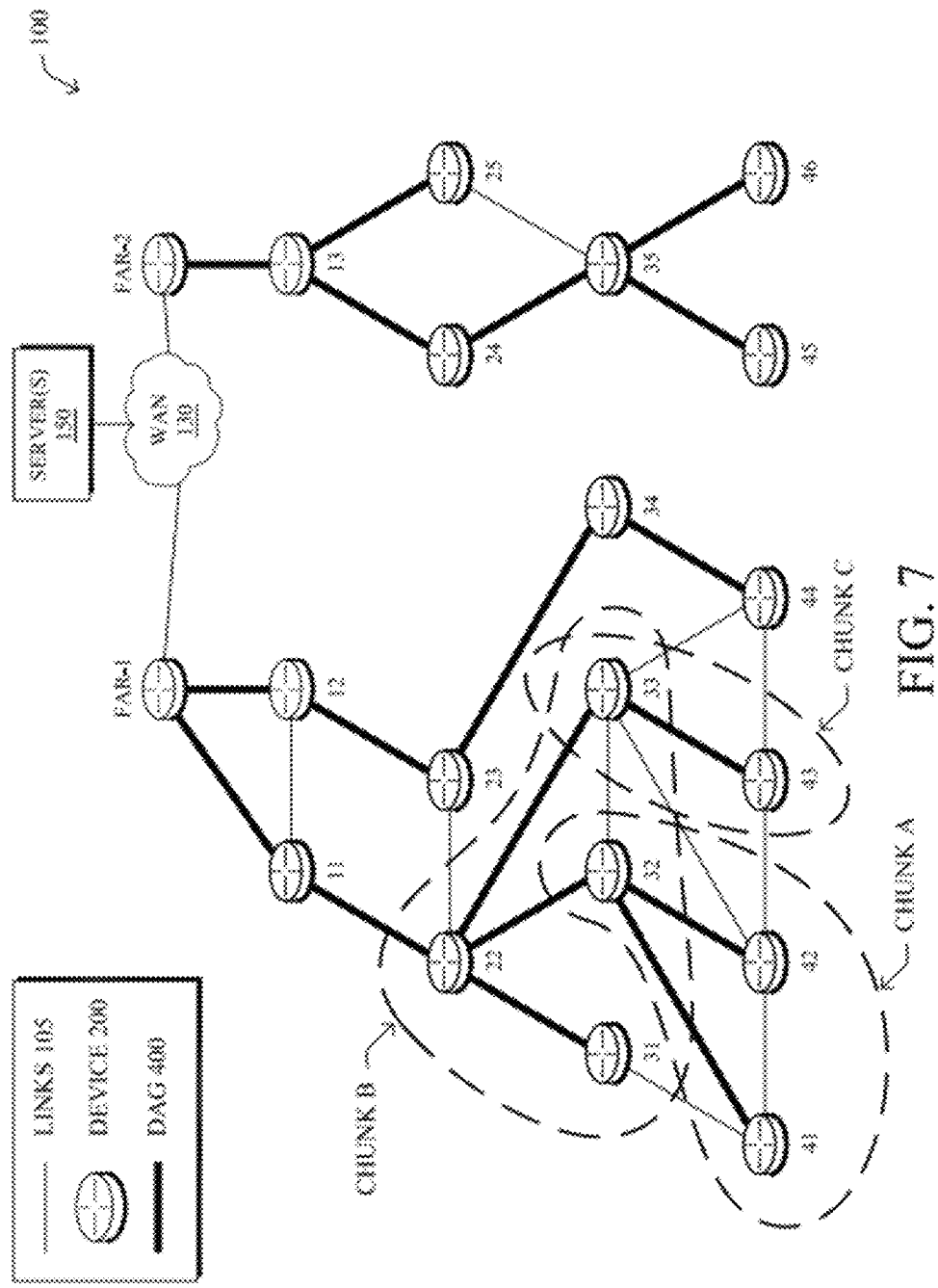
FIGS. 7-8 illustrate examples of a parent node in the network of FIG. 1 scheduling communications for a particular chunk.
Figure 8:
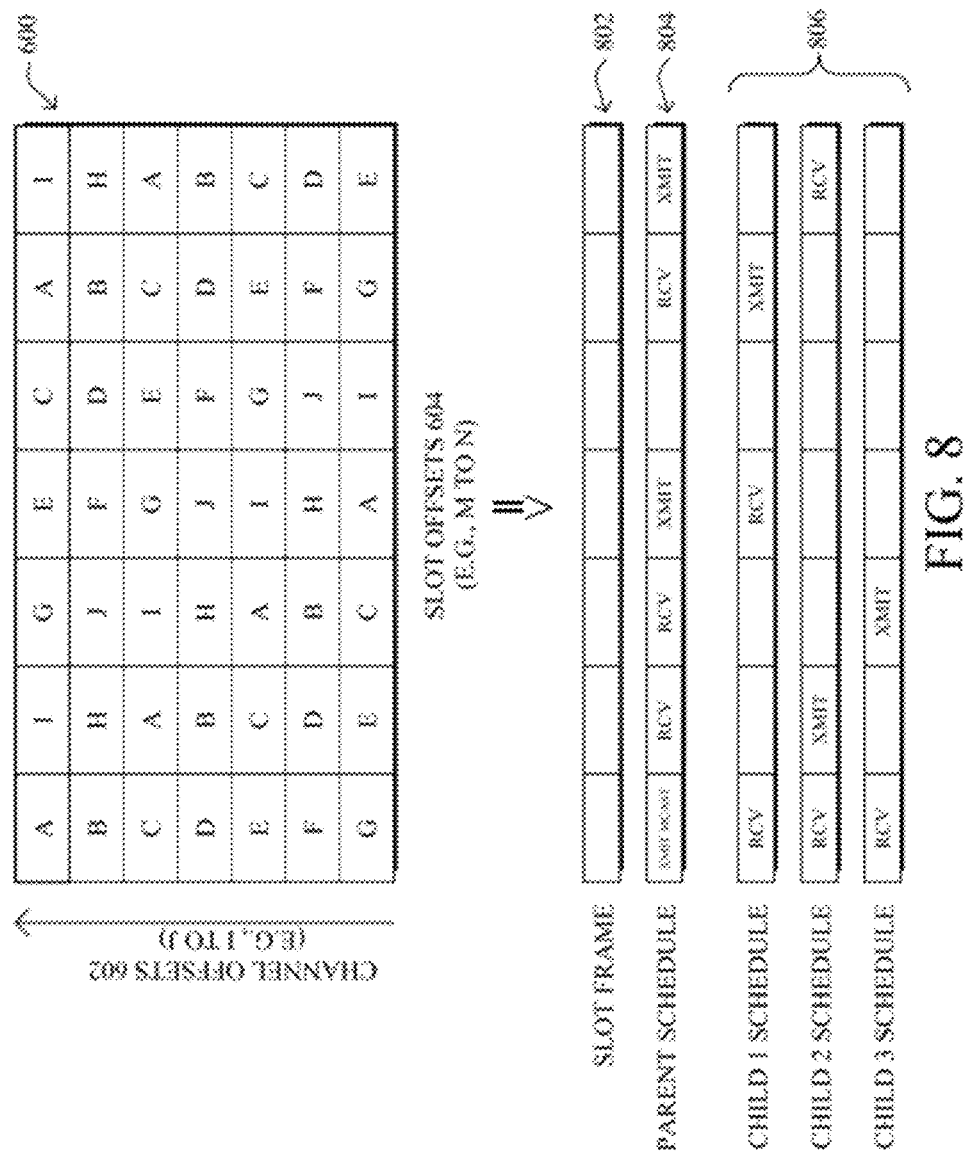

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/ channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. In other words, a 6TiSCH track may represent a given path in a network, with the successive cells/time slots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, channel hopping is a communication mechanism often employed in LLNs that entails varying channels between transmissions in a pseudo random fashion, to benefit from multiple channels in parallel and improve throughput. In general, channel hopping uses a pseudo-random sequence known to both transmitter and receiver. Compared with fixed frequency transmissions, channel hopping reduces the impact of loss on a particular channel due to uncontrolled external interference or multipath fading on that particular channel.

The current 6TiSCH and Wi-SUN standards use channel hopping, to avoid collisions. This mechanism is efficient when few nodes transmit at the same time. However, packet losses can still occur in the following situations:

1.) Interference (e.g., including the case of the destination transmitting at the same time, multiple transmissions to this node, hidden terminal issues, etc.).

2.) Excessive number of transmitters at a same time which causes collisions, even if the Wi-SUN channel distribution perfectly randomizes which channel is used by each transmission.

3.) Classical congestion loss (e.g., a node has more outstanding packets than there is bandwidth available).

The second situation above is particularly avoidable, as it is a direct result of how the communication schedule distributes transmissions over the available channels. To address this, standards such as Wi-Sun attempt to ensure that the channel used for the next transmission is selected in a perfectly random manner, to minimize the chances of periodic collisions with another transmission. But, even that does not protect against the chances of many transmission occurring at the same time, while there are very few transmissions at other times. Even if that randomization was perfect, when P transmissions over an interference domain are randomly distributed over N channels, the chance that two transmissions pick the same channel grows rapidly with P and collision is guaranteed when P>N. In other words, if many transmissions happen at a same time, and even if the channel selection is truly randomized, there is still a chance that more than one transmission occurs on the same channel, leading to interference.

Thus, regardless of how well randomization of a communication schedule is done over the available channels, transmissions spread only over channels are still sensitive to collisions due to peaks of transmissions where P is higher than average.

Time Multiplexed Channel Hopping for LLNs

The techniques herein introduce an approach to coordinating network communications that uses both frequency randomness, as well as time spreading. In some aspects, the time spreading reduces the chances of packet loss due to collisions that can occur when transmitters/senders send at the same time. In further aspects, transmissions can be scheduled based in part on the depth of a given node in the routing topology (e.g., nodes closer to the root node may have more communication timeslots than nodes that are farther away from the root node in the routing topology.

Specifically, according to one or more embodiments of the disclosure as described in detail below, a network device 200 receives data indicative of a routing topology of a network. The network includes a root node and each node in the network has an associated network depth relative to the root. The network device 200 selects a first subset of timeslots from a slotframe of a communication schedule based on the network depth of a particular node in the network. The network device 200 selects a second subset of timeslots from the first subset, based on a media access control (MAC) address of the particular node. The network device 200 assigns the second subset of timeslots to the particular node for reception in the slotframe of the communication schedule. The network device 200 sends the communication schedule to one or more nodes in the network.

Illustratively, the techniques described herein may be performed by hardware, software, and/or firmware, such as in accordance with the communication schedule process 248, which may include computer executable instructions executed by the processor circuit 220 (or independent processor circuit of interfaces 210) to perform functions relating to the techniques described herein, e.g., in conjunction with routing process 244.

Operationally, the techniques herein propose using time spreading to 1.) allow more bandwidth near the root of the network, 2.) avoid peaks in the transmission volume, and 3.) enable low power operations in the network. In some embodiments, the time spreading can also be combined with a mechanism whereby the set of N time slots between which the time-randomized selection happen and the number P of timeslots that may actually be used for transmission or reception are selected based on the depth of a node in the routing topology of the network and/or number of siblings. For example, the root node in a network that uses RPL may be assigned a larger number of timeslots so that the root gets a maximum number of communication opportunities, whereas nodes within the mesh get a randomized fair share of the bandwidth that is allocated based on their depth and done to fairly allocate slots among siblings in the topology.

Figure 9A:
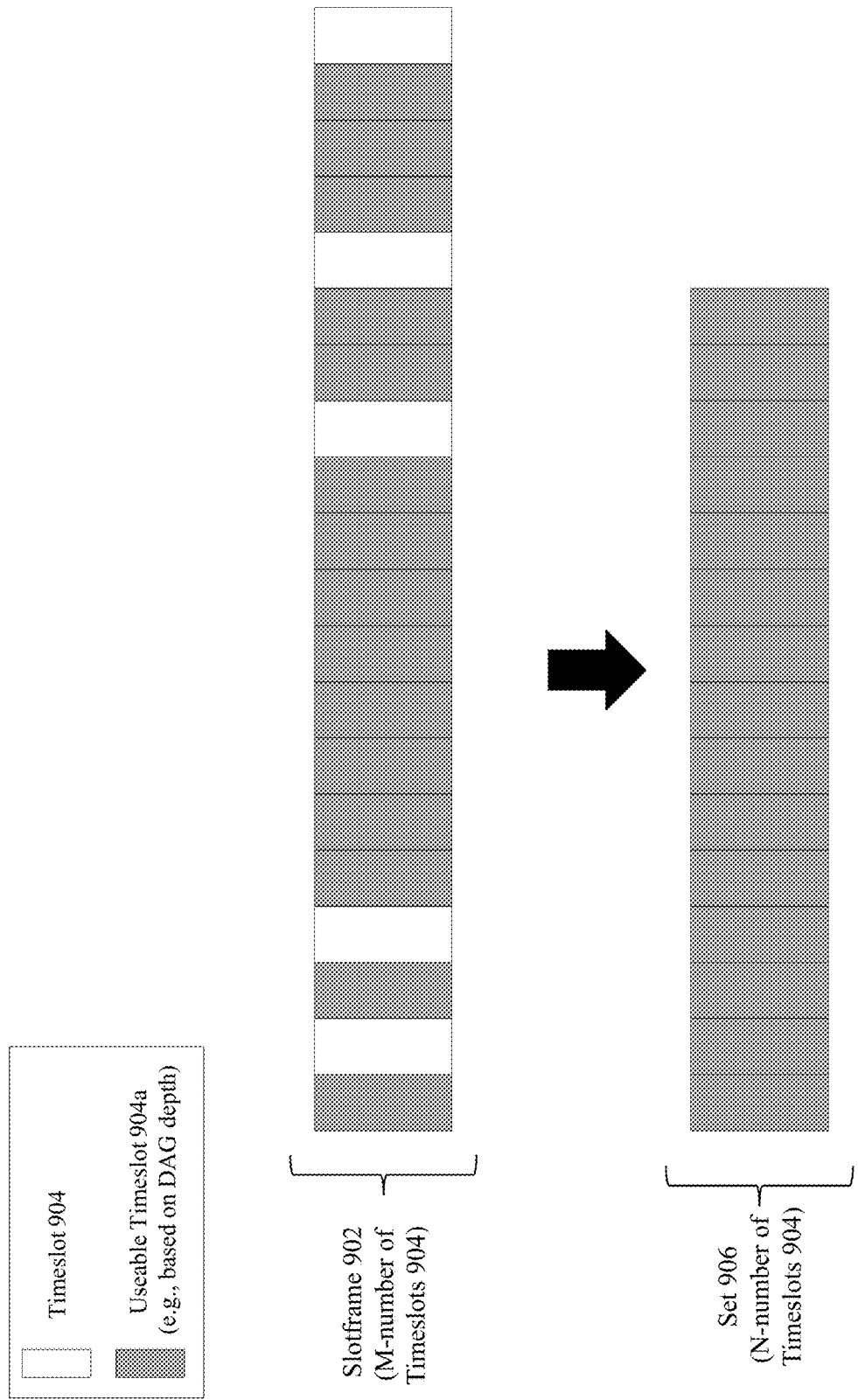
FIGS. 9A-9E illustrate examples of spreading timeslots over frequency and time.

FIGS. 9A-9E illustrate examples of spreading timeslots over frequency and time, according to various embodiments. In general, as in TSCH, timeslots may be grouped into sets of M-number of timeslots called slotframes. For example, as shown in FIG. 9A, assume that slotframe 902 comprises M-number of timeslots 904. In various embodiments, the network device 200 forming the communication schedule may select N-number of timeslots 904a used in the timeframe for use by a node in the network, based on the depth of the node in the routing topology of the network. For example, as shown, set 906 can be formed as a subset of the M-number of timeslots 904 in slotframe 902, with set 906 being of size N, based on the depth of the subject node in the routing topology. For example, in an RPL network, the selection of set 906 can be based on the depth of the subject node in the RPL DODAG. In further embodiments, this selection can be based in part on other factors, such as the upload vs. download traffic, queue sizes, or the like.

In some instances, set 906 may be computed for a certain network depth such that some timeslots 904 are available for transmit, some for receives, and/or some should not be used. Such an assignment may be static and does not depend on the identity of the sender or receiver (e.g., MAC address, etc.). Other assignments could also be used, as desired. Typically, the selection of timeslots from a slotframe, and their associated actions (e.g., transmit, receive, etc.) may be performed such that traffic is balanced with approximately 30-70% of the timeslots dedicated to transmission at a certain network depth and this percentage flip-flopped for the next depth, so as not to overlap.

Figure 9B:
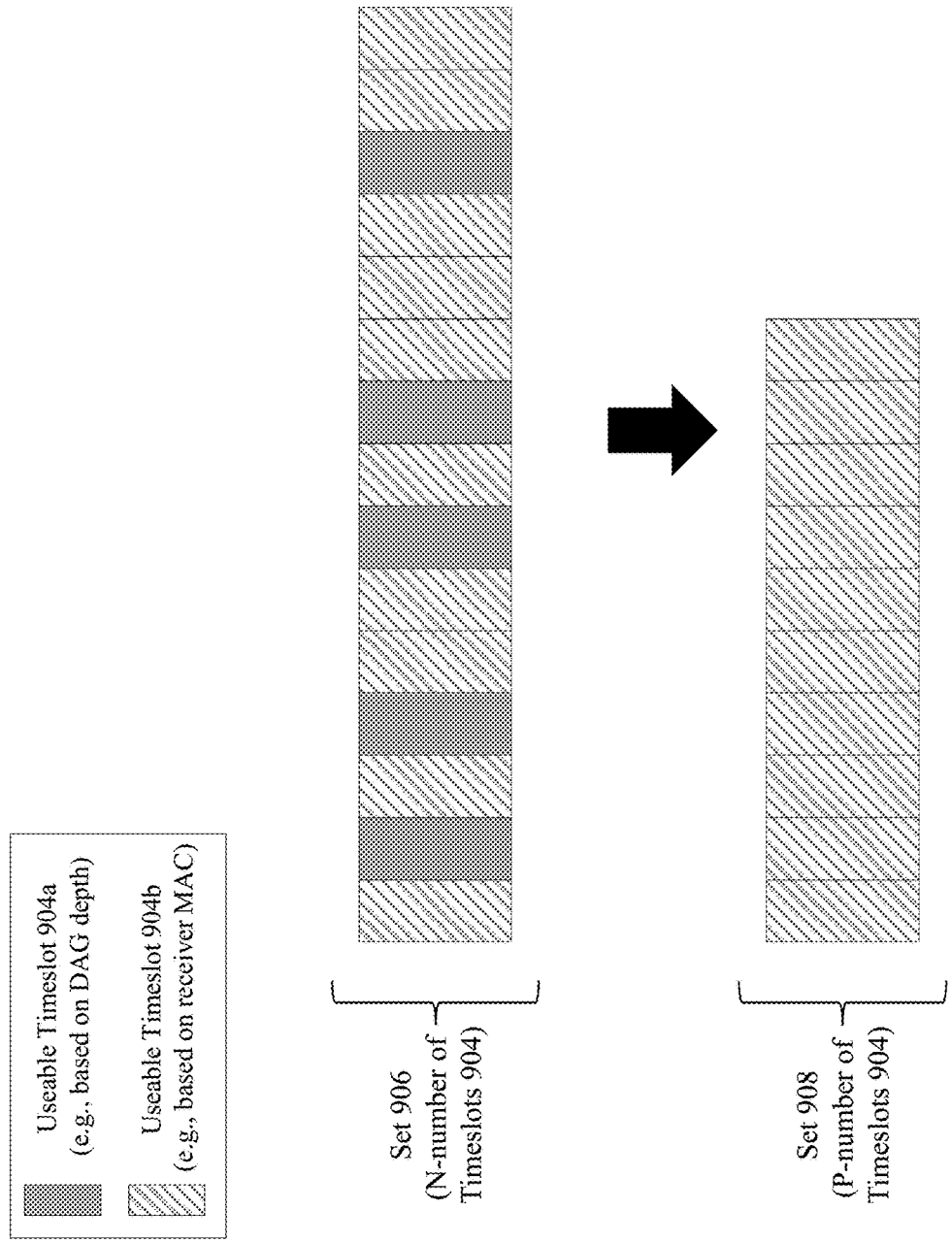

In various embodiments, to enable fair sharing between sibling nodes and reduce energy consumption by low power devices, a subset of N-number of timeslots for a receiver can be further reduced to second subset of P-number of timeslots, based on the MAC address or other identifier of the receiver node. For example, as shown in FIG. 9B, set 906 comprising N-number of timeslots 904a can be further reduced into a second subset, set 908 of P-number of timeslots 904b, based on the MAC address of the receiver node.

Figure 9C:
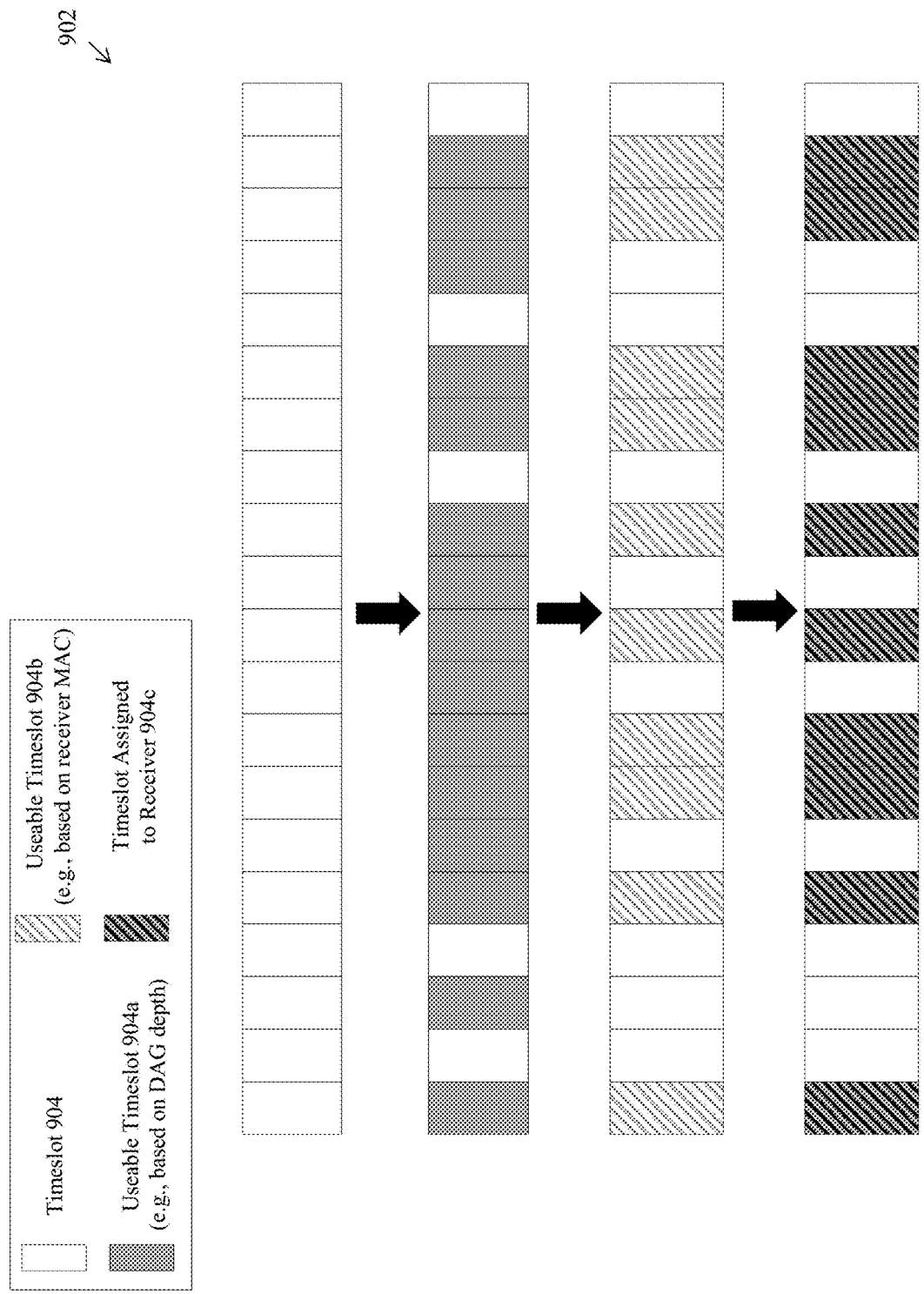

FIG. 9C illustrates the full progression of the assignment of timeslots 904 to a receiver node. As shown, N-number of timeslots 904a may be selected from the M-number of timeslots 904 in slotframe 902 based on the depth of the receiver node in the routing topology. For example, the size of N may be a function of the distance of the receiver node to the root node in the routing topology. In turn, P-number of timeslots 904b may selected from the N-number of timeslots 904a, based on the MAC address of the receiver (e.g., as a randomizing seed value). In turn, these P-number of timeslots 904b may be assigned to slotframe 902 as receive timeslots 904c for the subject receiver node.

In some embodiments, the number P can be caped based on power saving configuration to some value $P_{Max}$. P may also depend on the depth since there is less traffic per node away from the root and less chances of interferences as packets flow from/to the root in different directions. This may be useful for peer-to-peer (P2P) traffic at the edge. As a rule of a thumb, N may be roughly 30-50% slots of the timeslots in the slotframe (e.g., half of the timeslots for receive and half for transmit). In further embodiments, P can be N divided by the average number or interfering siblings, with a ponderation based on their relative traffic and multiplied by an overbooking factor ≥1, which grows with the depth. For example, P and N may be selected as follows:

Depth 0: transmission to/from root is spread over N timeslots that represents as close as possible to 50% of the slots.

Depth 1: N now represents 20-40% of the slots that are non-overlapping with those used at the root, based on the average number or interfering siblings.

Depth >1: same as above with an overbooking factor >1 that grows rapidly with depth.

P may be dynamic and may be exposed in MAC layer beacons and/or in L2 acknowledgements. In some cases, the sender node may not know the current value of P but knows the minimal value of P, thereby allowing the sender to start using that minimal value and then receive the current value of P in a L2 acknowledgement.

A sender may employ any of several techniques to communicate with a given receiver. In some embodiments, a series of hashes based on the MAC address of the receiver and an increment, i, can be used for purposes of communicating with the receiver. In such a case, the N modulo can be taken for each new hash. When P different values are found, these values can then be used by the receiver as the indexes in the N timeslots. By inverting the compression process used to obtain the P-number of timeslots, a sender node can randomly distribute the receiver timeslots in the slotframe via which the sender communicates with the receiver, based on the MAC address of the receiver. However, this may still lead to collisions, if two senders both select the same timeslot.

To avoid collisions between senders, a given sender node may also spread its transmissions to a receiver over time based on its own MAC address (e.g., as a randomizing seed). For example, assume that there is a hash function defined that includes at least the MAC address of the sender and an increment of i. If the sender needs to send Q≤P messages to a particular receiver during a slotframe, then the sender may compute a series of hashes, incrementing by i each time. For each hash, the sender may compute the P modulo, repeating this process until Q different values are found. In order to reduce latency, Q may be computed in advance based on history as opposed to what is in the queue of the sender. This can be done by using time series and simple numeric filters, or can be done remotely by a learning machine that computes a schedule of values of Q for the upcoming slotframes.

When a sender needs to send to multiple parties, the timeslots selected for different ones may collide, meaning that a sender would be scheduled to send to multiple parties at the same time. In order to avoid that effect, an overbooking method of computing a larger value for Q than apparently needed allows the node to have alternate time slots and avoid the collisions. The values serve as offset in the sequence of P slots, which are then repositioned in the global communication schedule. As a result, the senders for a given receiver are distributed statistically over the timeslots for which the receiver is expecting packets.

Note that the channel can be determined in any fashion, including TSCH channel hopping or one of Wi-SUN's hopping sequences, which are based on receiver MAC address. Note also that the sender node may select the packet for each time slot in any order it likes, e.g. based on QoS or age of the packet. In some embodiments, dynamic parameters of the network/nodes, such as the queue sizes and/or number of children, can be monitored and used to change the value of P, adaptively. For example, nodes with longer queues can get a bigger P value, nodes with more children may have a larger P value, etc. P can also be optimized for regular traffic patterns, such as meter readings, firmware upgrades, or the like.

Figure 9D:
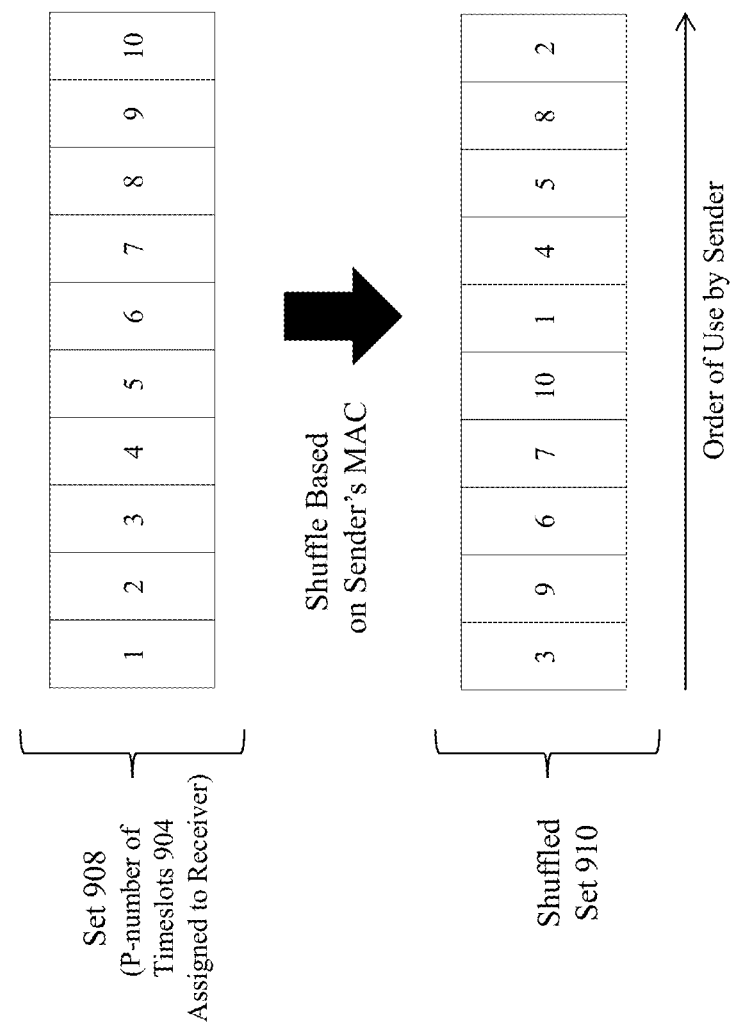
Figure 9E:
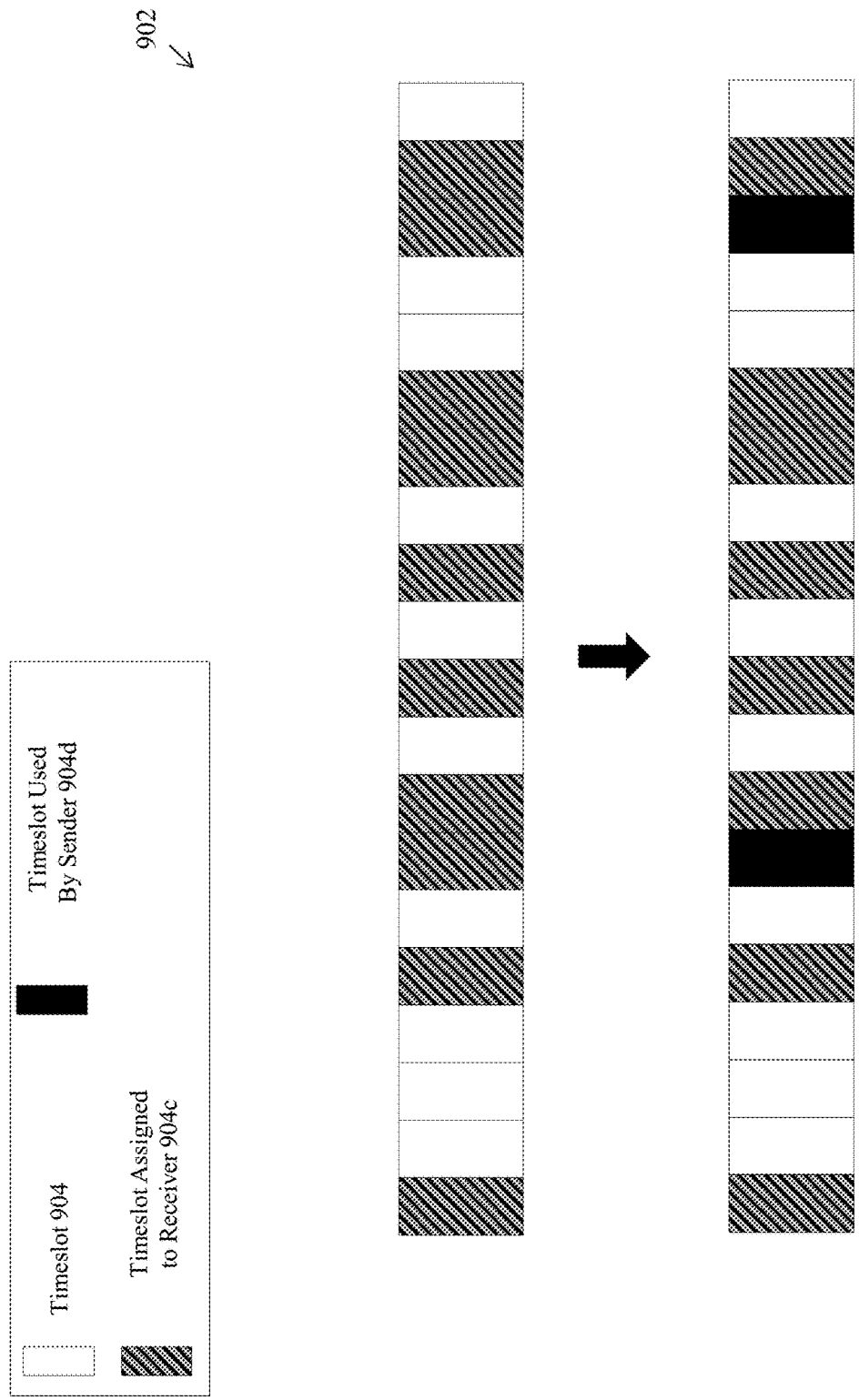

Rather than a sender node using hashes to select timeslots in which to send packets to the receiver, another embodiment provides for the sender node to simply shuffle (e.g., reorganize) the P-number of receiver timeslots and send packets according to the new ordering. For example, as shown in FIG. 9D, assume that the P-number of timeslots in set 908 are ordered from 1-10. In order to communicate with the receiver, a sender node may pseudo-randomly shuffle the ordering of timeslots in set 908 and send packets to the receiver according to the new ordering. For example, the sender may utilize the third timeslot, then the ninth timeslot, then the sixth timeslot, etc., to send packets to the receiver. In doing so, the communications from the sender are also spread out temporally, reducing the possibility of collision with other nodes that are also sending packets to the receiver node. Thus, as shown in FIG. 9E, while slotframe 902 includes P-number of timeslots 904$c$ assigned to the receiver node, the sender node may use the above shuffling approach, to transmit packets to the receiver via timeslots 904$d$ shown.

In some embodiments, any variation of Fisher-Yates shuffling may be performed, to shuffle an array. For example, shuffling of an array A of size X may be performed as follows, based on a given MAC address D. First, partition D into 16-bit words, and cast the result as a 16-bit, unsigned integer. Next, perform XOR on the resulting terms. Then, perform a bitwise rotation to the left i-number of times on the resulting 16-bit unsigned integer. Next, take the modulo i of the result, to obtain j. Pseudocode for the shuffling is then as follows:

for i from X−1 down to 1 do
      set j to a pseudo-randomly selected integer strictly less than i
      exchange A[j] and A[i].

Figure 10A:
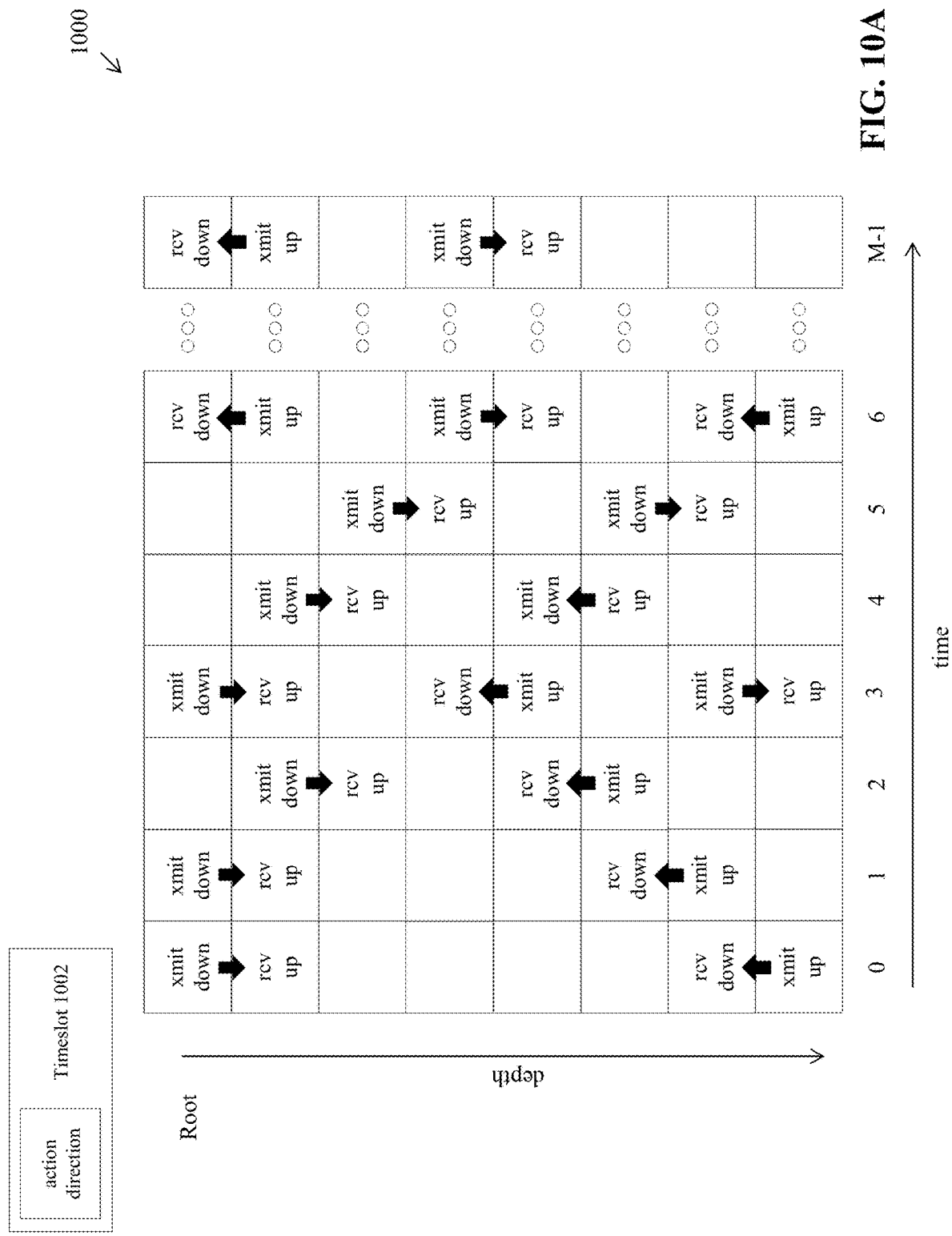
FIGS. 10A-10F illustrate examples of timeslot assignment and usage in a 6TiSCH network.

FIGS. 10A-10F illustrate examples of timeslot assignment and usage, for example generated by individual network devices 200 and/or in a 6TiSCH network, according to various embodiments. FIG. 10A illustrates an example depth-aware communication schedule 1000 comprising a plurality of timeslots 1002 that can be established either centrally (e.g., in a 6TiSCH network), or distributed among each of the network devices 200 in a tree-based network (e.g., a RPL network), where each of the network devices 200 can generate at least a portion of the depth-aware communications schedule 1000 as described previously with respect to FIGS. 9A-9E. As described in further detail herein, each of the network devices can independently generate consistent timeslot schedules based on consistently executing the same rules and operations for timeslot assignment (e.g., hash operations, Fisher-Yates shuffling, etc.) where different input parameters (e.g., depth, sender MAC address, receiver MAC address, etc.) can be used to uniquely identify an exclusive role for a given timeslot 1002 at a given depth.

As shown in FIG. 10A, communication schedule 1000 may be based on the depth (e.g., D1 through D7) of the nodes in the routing topology. For example, nodes that are substantially near the root node (e.g., one hop away D1 from the root node or two hops D2 away from the root) may be assigned more timeslots 1002 in schedule 1000 than nodes that are farther away from the root (e.g., at depths D3 through D7). Thus, at any given depth in the network topology, there may be N-number of assigned timeslots available for use in communication schedule out of the M-number of timeslots (e.g., ranging from timeslot index 0 to index M−1).

For each timeslot 902 in communication schedule 1000, there may an assigned action and direction. For example, a given timeslot may be a transmit timeslot or a receive timeslot, denoted 'xmit' and 'rcv' in FIG. 10A, respectively. Similarly, the direction may indicate whether a given node is to communicate with its parent node in the topology or a child node in the topology. At the same time, the parent or child node may be assigned the corresponding action. For example, a timeslot for a parent node to transmit down to a child of that node may be paired with another timeslot in which the child node receives upward from the parent.

As described in further detail below with respect to FIGS. 13 and 14, during use depth-aware communication schedule 1000 may serve as a filter that limits what a given node can do at a particular time, based on the depth of the node in the network; consequently, the depth-aware communication schedule in FIG. 10A can include idle cells where a given network device cannot transmit or receive. In particular, FIG. 10A illustrates that the depth-aware schedule 100 can include at least twenty-eight (28) idle cells labeled "idle".

However, in order to use more bandwidth for priority packets that are greater than the risk of a higher chance of collision, In-Case-of-Emergency (ICE) cells can also be assigned by a network device. In general, a receive ICE cell ("rcv ICE") is treated as a normal receive cell, but with particular settings for guard time and clear channel assessment (CCA) parameters, described below with respect to FIG. 14. Conversely, a transmit ICE ("xmit ICE") cell is to be treated as an idle cell unless a packet meets predefined criteria (e.g., a high priority packet, retries are about a certain retry count, a packet delay over a certain time threshold, the queue reaches a certain size, etc.), described below.

Figure 10B:
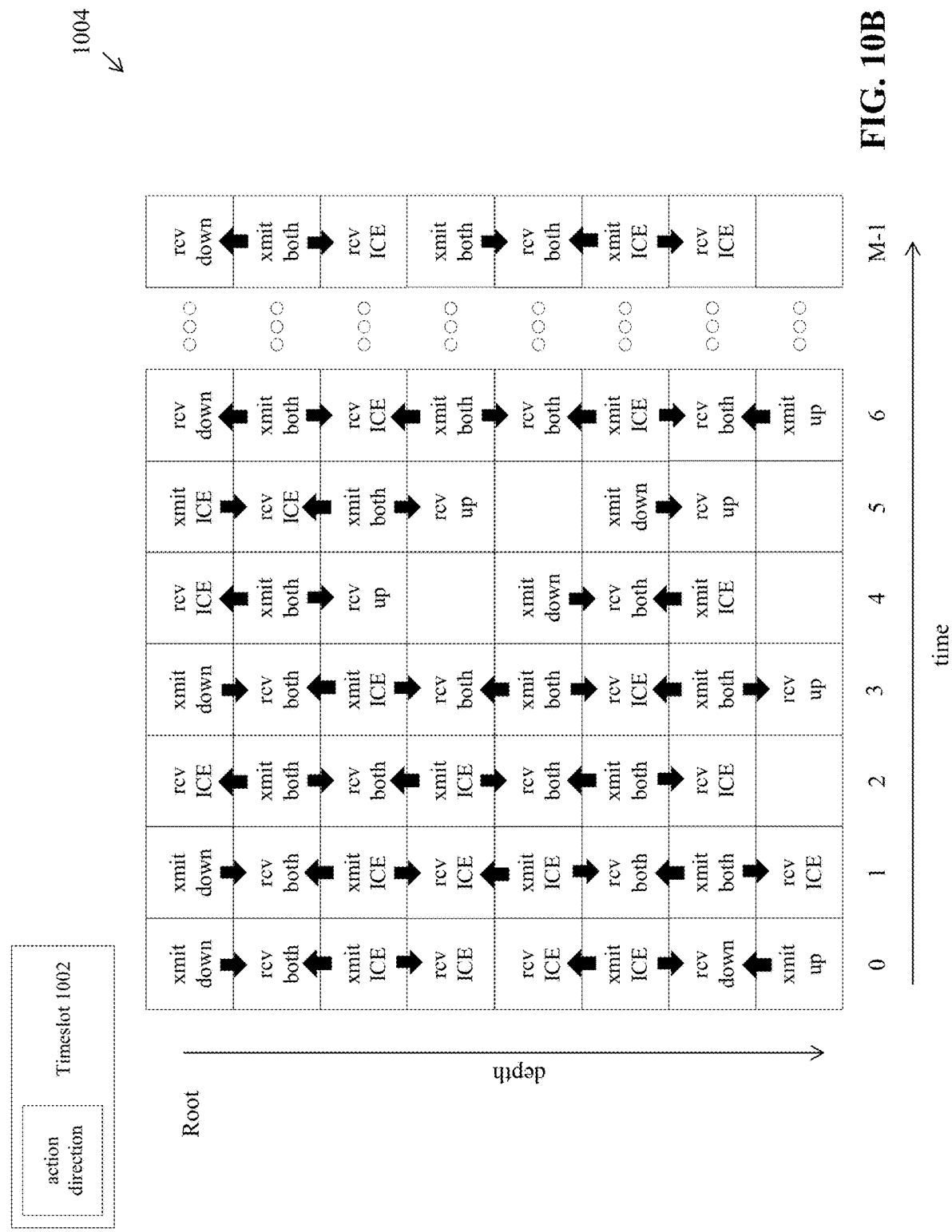

FIG. 10B illustrates a depth-aware communication schedule 1004 that is based on schedule 1000, but also leverages the use of ICE cells, in addition to receive and transmit cells. As shown in FIG. 10B, the number of idle cells has been reduced from twenty-eight (28) as in FIG. 10A to six (6); moreover, prioritization ICE timeslots can be prioritized for nodes substantially near the root node (e.g., at root or depth D1), resulting in zero idle slots at the root level. As described below, the maintaining of idle cells (e.g., at depth D3 at timeslot 4, depth D4 at timeslot 5) can be reduced to cases to avoid an allocation collision where only one idle cell exists (e.g., D3 at timeslot 4) between a neighboring-depth transmit cell (e.g., D4 at timeslot 4) and a neighboring-depth receive cell (e.g., D2 at timeslot 4). In the case in which a normal receive cell is next to an ICE transmit cell, that cell must expect packets from that ICE cell, even if it is not the expected reception direction. Thus, rather than expecting a communication from one direction (e.g., up or down the DODAG), the node must be ready to receive at that time from either direction. Conversely, a normal transmit cell may also transmit packets that meet certain criteria towards an ICE cell, even if that is not the expected direction.

In various embodiments, the time shifting approaches described above can be applied to a depth-aware communication schedule, such as schedule 1000 in FIG. 10A or schedule 1004 in FIG. 10B. As noted, MAC-based pseudo-randomization provides an efficient spreading of stochastic traffic over the available channels, as well as across time, thereby reducing the potential for collisions.

Figure 10C:
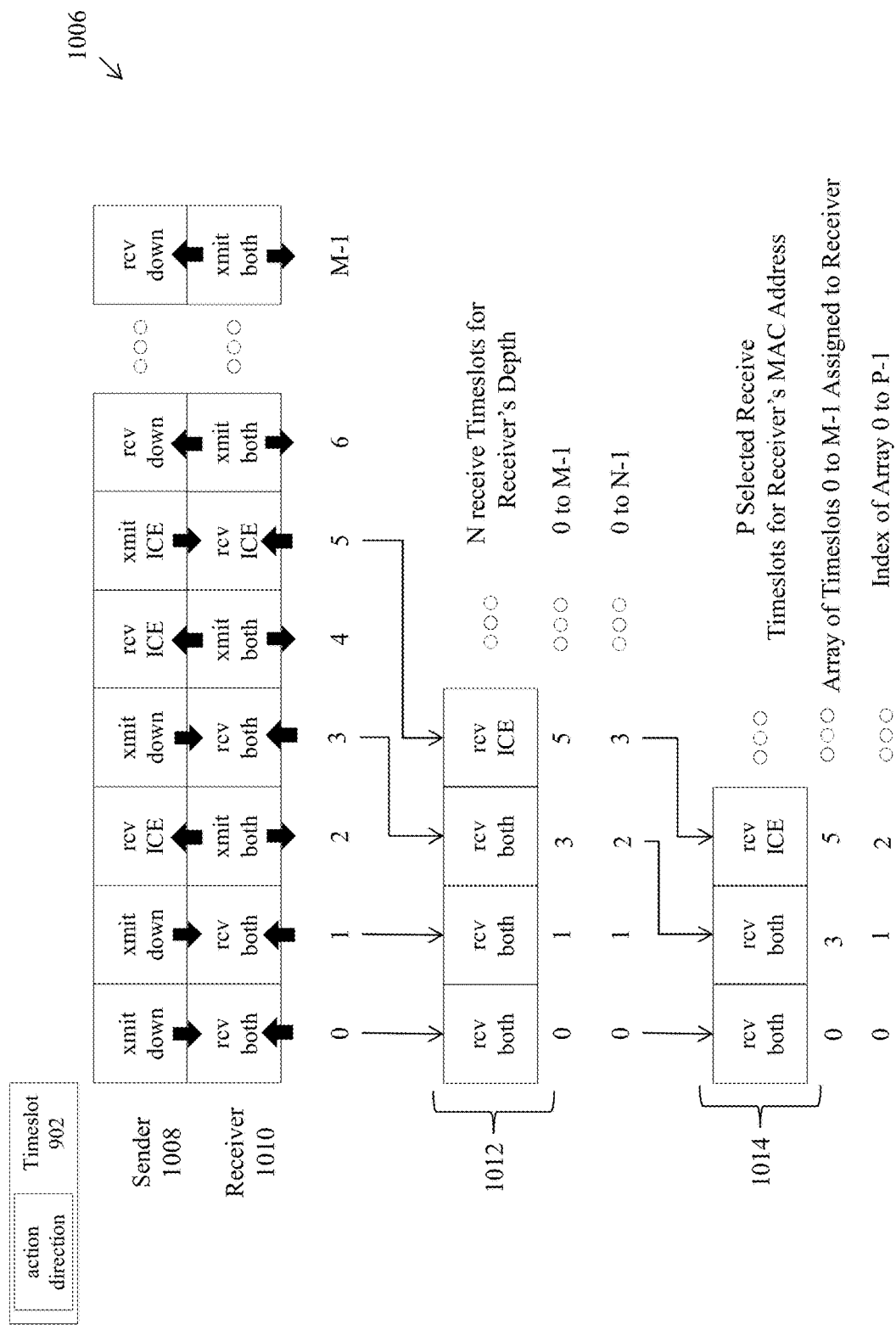

As shown in FIG. 10C, consider a portion 1006 of communication schedule 1004, such as two rows or slotframes from schedule 1004. Each row may comprise M-number of timeslots 902 with an assigned action and direction. Out of these M-number of timeslots 902 in the row of depth-aware communication schedule 1004, a subset 1012 comprising N-number of timeslots may be selected, representing the timeslots for sender 1008 and receiver 1010 that align with one another (e.g., receiver 1010 is to receive when sender 1008 sends). For illustrative purposes, assume that timeslots 902 are ordered in time from timeslot 0 to timeslot M−1. Thus, as shown, the timeslots 902 in subset 1012 may be indexed as [0, 1, 3, 5 . . . ] in the full row and may be indexed from [0, 1, 2, . . . , N−1] in subset 1012.

From subset 1012, a second subset 1014 can be selected pseudo-randomly, based on the MAC address of receiver 1010. As shown, subset 1012 may include P-number of timeslots 1002 from subset 1012, thereby allowing fair sharing between sibling senders and to enable power savings for low-power senders. From an indexing standpoint, the timeslots in subset 1014 may comprise timeslots [0, 3, 5, . . . ] in the full row of 0 to M−1 timeslots, each of which may be mapped to a corresponding index ranging from 0 to P−1.

In various embodiments, one constraint may be that the value of P (e.g., the size of subset 1014) must be equal to or larger than a predefined $P_{min}$. During operation, if a sender does not know the exact value of P for its destination receiver, the sender node may simply use $P_{min}$. In turn, the receiver may advertise its value of P via information elements (IEs) or some other distribution mechanism.

As a result of the operation depicted in FIG. 10C, the receiver timeslots 902 in subset 1014 are pseudo-randomly distributed in the slotframe and any sender can identify them based on the value of P and the MAC address of receiver 1010.

Figure 10D:
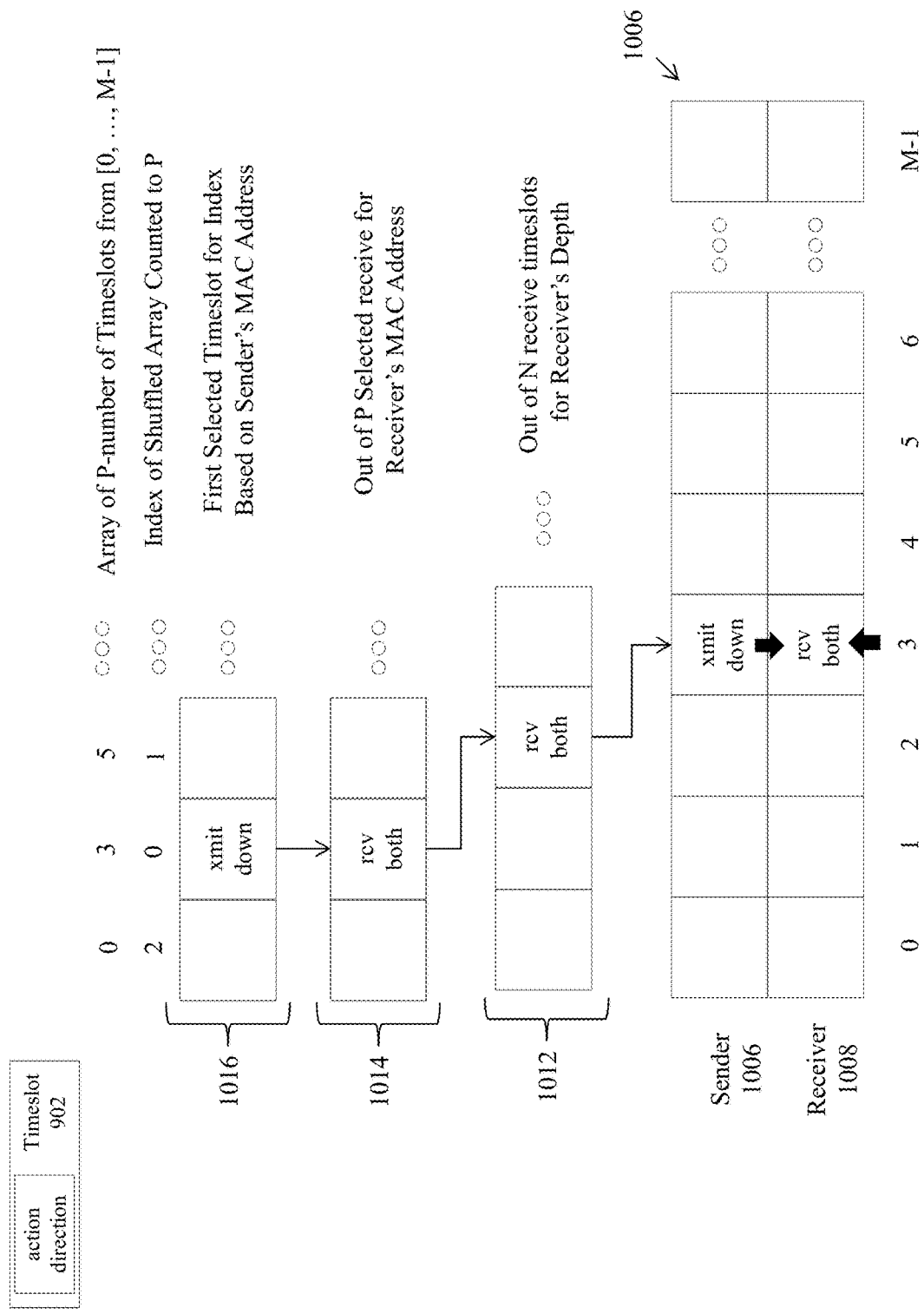

To avoid any collisions between multiple senders to receiver 1010, each sender may also pseudo-randomly select transmit timeslots that correspond to the P-number of timeslots 902 in subset 1014, based on the MAC address of the sender, in various embodiments. For example, FIG. 10D illustrates an example of sender 1008 sending a communication to receiver 1010. Continuing the example of FIG. 10C, sender 1008 may use the MAC address of receiver 1010 and the value of P (or $P_{min}$, if unknown), to identify the timeslots 1002 in subset 1014, which are indexed as [0, 3, 5, . . . ] in the slotframe of M-number of timeslots and indexed as [0, 1, 2, . . . , P−1] in subset 1014.

Once the P-number of reception timeslots are identified by sender 1008, sender 1008 may place the P-number of timeslots in subset 1014 into an array that is shuffled pseudo-randomly based on the MAC address of sender 1008. For example, as shown, the [0, 1, 2, . . . , P−1] indexed timeslots 902 in subset 1012 may be shuffled into an array of [2, 0, 1, . . . , P−1] by reordering the index. In other words, the first timeslot 902 in subset 1014 may become the second timeslot in the shuffled array, the third timeslot 902 in subset 1014 may become the first timeslot in the shuffled array, etc. Doing so effectively redistributes the timeslots in time.

If a sender needs to send Q<P number of messages to a particular destination during a slotframe, it may pick its corresponding transmit timeslots according to the order of the shuffled array. For example, sender 1008 may select its own transmit timeslot 902 from among its P-number of transmit timeslots 1016 that correspond to receive timeslots in subset 1014, according to the order of the shuffled array. From that, the reverse mapping of subset 1014 back to subset 1012 and then back to the slotframes 1006 gives way to the first timeslot to be used by sender 1008 for purposes of sending a communication to receiver 1010. In other words, even though the first timeslot at index 0 in [0, . . . , M−1] is eligible to be used for this communication, sender 1008 may instead transmit the packet to receiver 1010 using the fourth timeslot at index 3 in [0, . . . , M−1]. Likewise, if sender 1008 is to send multiple messages, the next message may be sent using the first timeslot at index 0 in [0, . . . , M−1], in accordance with the shuffled array. In doing so, communications from sender 1008 to receiver 1010 are pseudo-randomly spread in time across the P-number of timeslots available for such communications. In doing so, this helps prevent collisions if another sender were also to send communications to receiver 1010.

When sender 1008 needs to send communications to multiple parties, a given timeslot may be selected for more than one destination, meaning that sender 1008 may be scheduled to send to two or more receivers at the same time. In that case, sender 1008 may skip the particular timeslot in the shuffled array of one of the destinations. In turn, the values in use can serve as an offset in the sequence of P-slots, which are then repositioned in the global schedule.

Figure 10E:
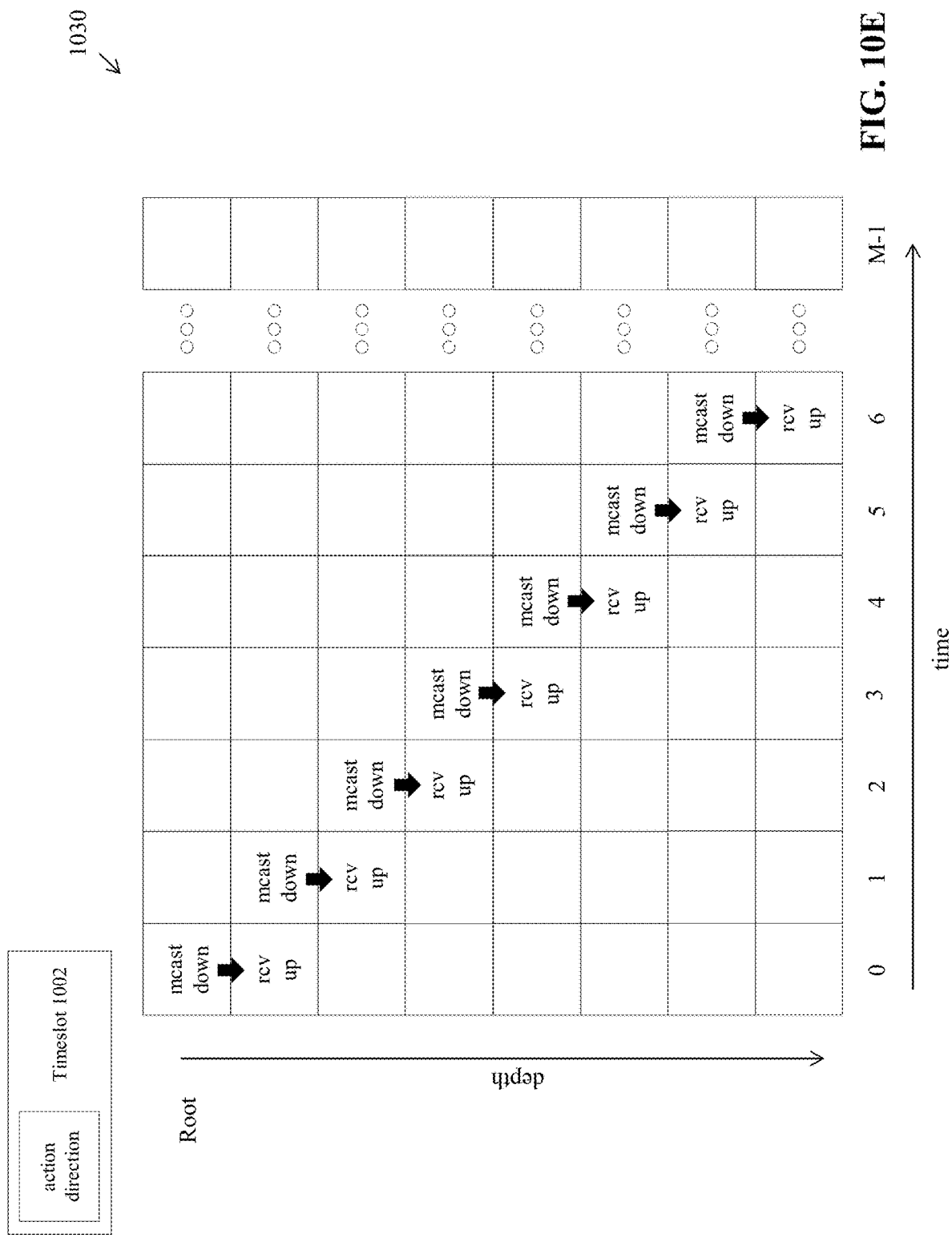
Figure 10F:
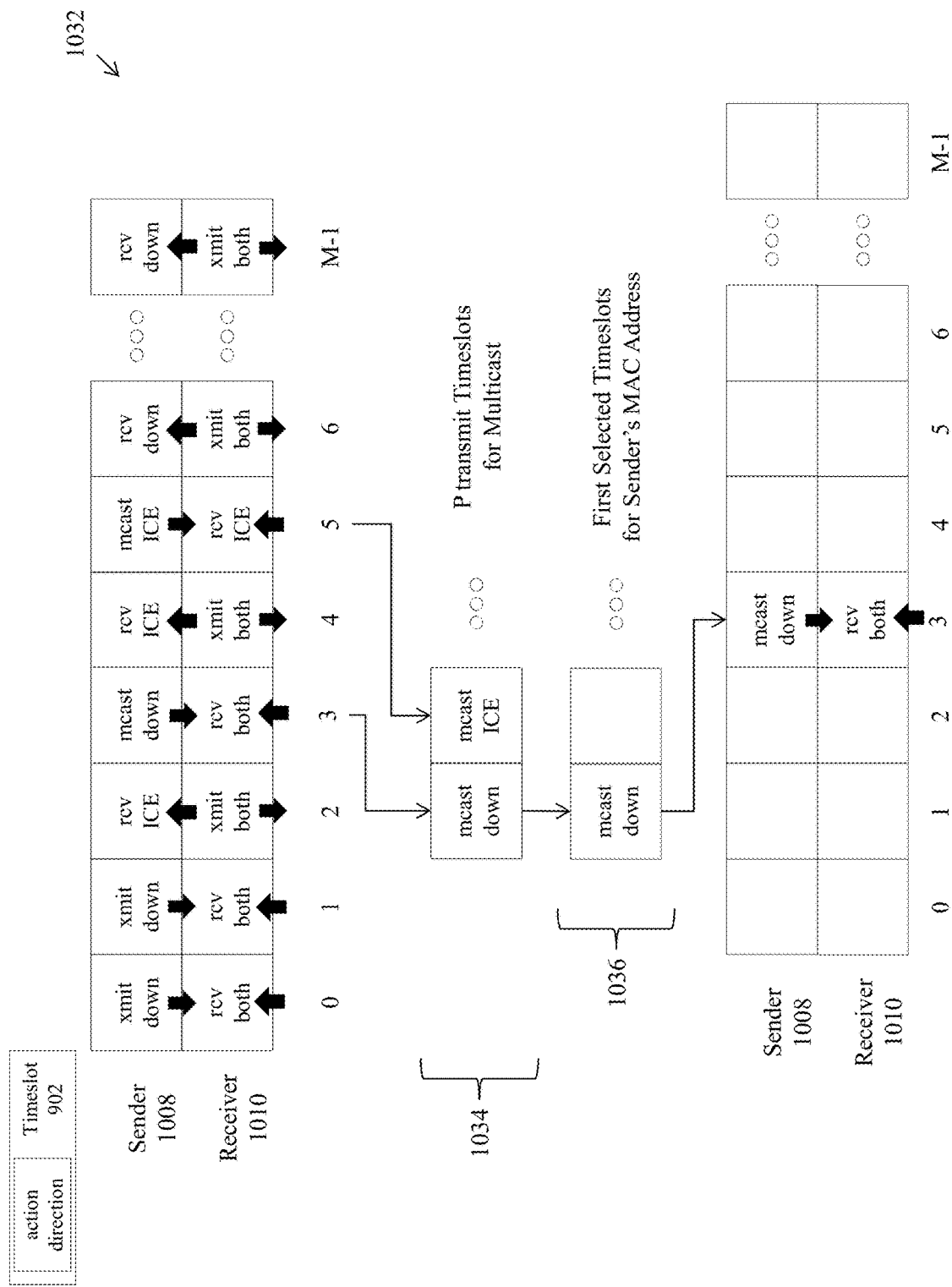

Multicast operations in a 6TiSCH network employing the techniques herein are illustrated in FIGS. 10E-10F. For relatively rare and asynchronous multicast actions, denoted 'mcast' in FIGS. 10E-10F, timeslots in the depth-aware, unicast communication schedule may be marked as "shared." When such a timeslot is shared, any sender may transmit and all receivers are expected to listen, regardless of the MAC addresses of the sender and receiver, in some embodiments. Note that in networks, such as RPL-based networks, an important portion of the multicast messages are propagated down the topology from parent to children. Depending on the volume of this traffic, the shared timeslots used by parents for multicast messages may be interleaved. FIG. 10E illustrates such an interleaving of multicast timeslots in a depth-aware communication schedule 1030. Also of note is that communication schedule 1030 is more realistic for a plain flood than for RPL operations, since RPL need to process the DIO and then arm a timer, so there is no way that the propagated DIO can occur on the very next slot.

As would be appreciated, multicast messages are propagated down the RPL topology from parent to children. As these children are aware of their parents, it is also possible to spread these multicast messages over time based on the MAC address of the parent. Doing so, similar to unicast messages, allows for a reduction in the chance of collisions between parents, as well as the number of duplicate messages received by the children.

When a given sender node wishes to send a multicast message, it may employ a method similar to unicast transmissions, to spread its multicast transmissions in the time domain, based on its own MAC address. For example, as shown in FIG. 10F, consider portion 1032 of a depth-aware communication schedule for sender 1008 and receiver 1010. In these rows for sender 1008 and receiver 1010, there may be M-number of timeslots 902 each, with P-number of pairs of timeslots in which sender 1008 can send a multicast message and receiver 1010 can receive the multicast. For example, assume that there is a subset 1034 comprising P-number of timeslots during which sender 1008 can send multicast messages and receiver 1010 will receive them. In such a case, sender 1008 may shuffle these timeslots and send the multicast using the first indexed timeslot 1036 in the shuffled array. As shown, this translates out to be index 3 in the [0, . . . , M−1] timeslots in portion 1032 from the communication schedule. As a result, the multicast messages from sender 1008 are also spread in time.

Figure 11:
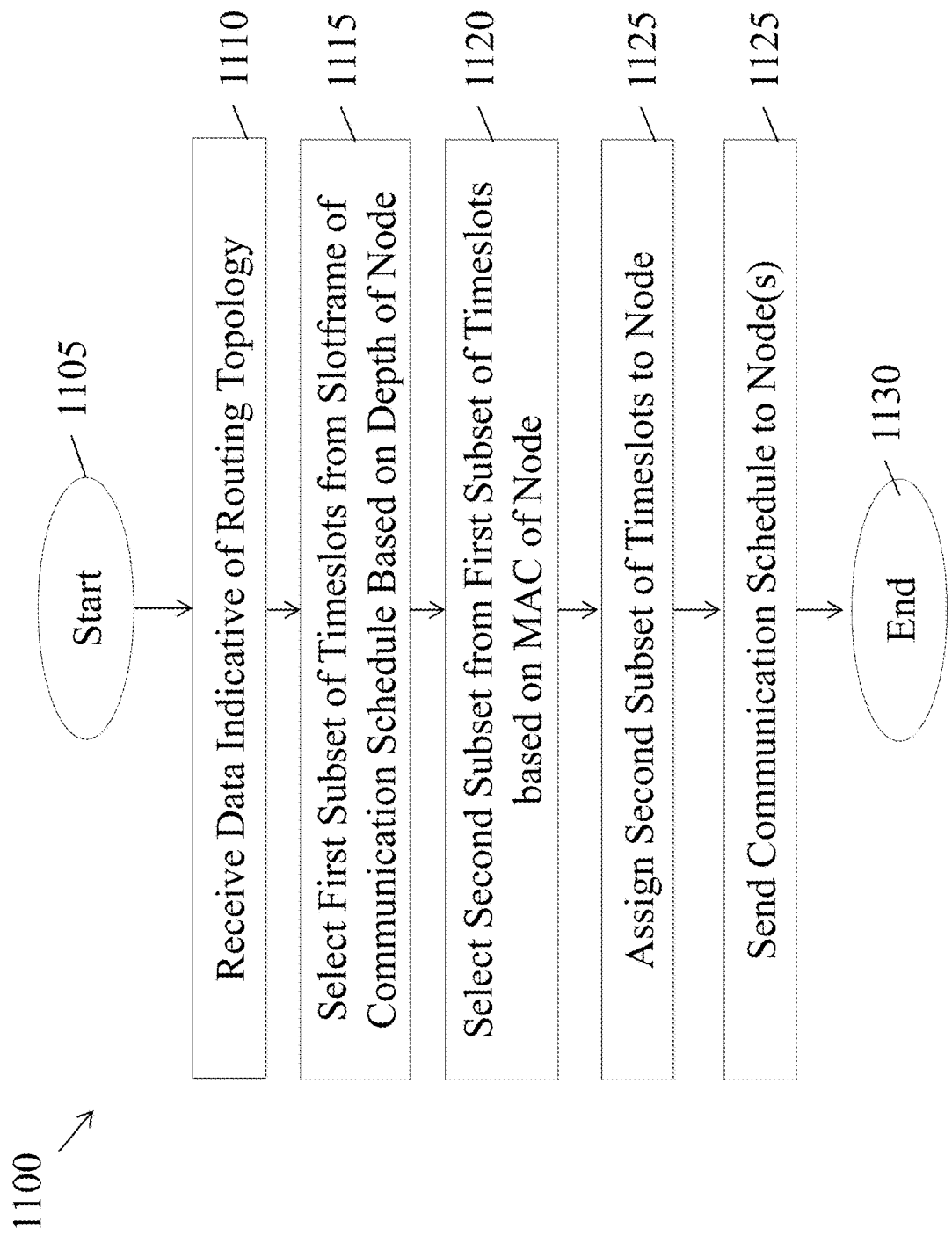
FIG. 11 illustrates an example simplified procedure for assigning timeslots to a receiver in a network.

FIG. 11 illustrates an example simplified procedure for assigning timeslots to a receiver in a network, in a network in accordance with one or more embodiments described herein. For example, a non-generic, specifically configured device (e.g., device 200) may perform procedure 1100 by executing stored instructions (e.g., process 248). The procedure 1100 may start at operation 1105, and continues to operation 1110, where, as described in greater detail above, the network device 200 may receive data indicative of a routing topology of a network. In various embodiments, the network may include a root node and each node in the network has an associated network depth relative to the root. For example, in the case of an RPL routed network, the depth may correspond to the number of hops between a given node and the root node in the DODAG.

At operation 1115, as detailed above, the network device 200 may select a first subset of timeslots from a slotframe of a communication schedule based on the network depth of a particular node in the network. In various embodiments, the size of the first subset of timeslots for the particular node may be a function of how close (e.g., number of hops) the node is to the root node in the network. For example, nodes closer to the root node, as well the root node itself, may have a larger number of timeslots than nodes that are farther away from the root node in the routing topology.

At operation 1120, the network device 200 may select a second subset of timeslots from the first subset, based on a media access control (MAC) address of the particular node, as described in greater detail above. In various embodiments, only a subset of the first subset of timeslots may be used by the particular node for purposes of receiving communications. The MAC address of the particular node, or another node identifier, may be used as a random seed, hash input, or other parameter that can be used to select the second subset of timeslots from the first subset.

At operation 1125, as detailed above, the network device 200 may assign the second subset of timeslots to the particular node for reception in the slotframe of the communication schedule. In doing so, the particular node may use P-number of timeframes in the slotframe for reception, out of the N-number of timeframes selected based on the depth of the particular node in the routing topology.

At operation 1130, the network device 200 may send the communication schedule to one or more nodes in the network. Such a communication schedule may be based on Wi-Sun, 6TiSCH, or another standard for coordinating communications across frequencies and time, in a shared communication network. Procedure 1100 then ends at operation 1135.

Figure 12:
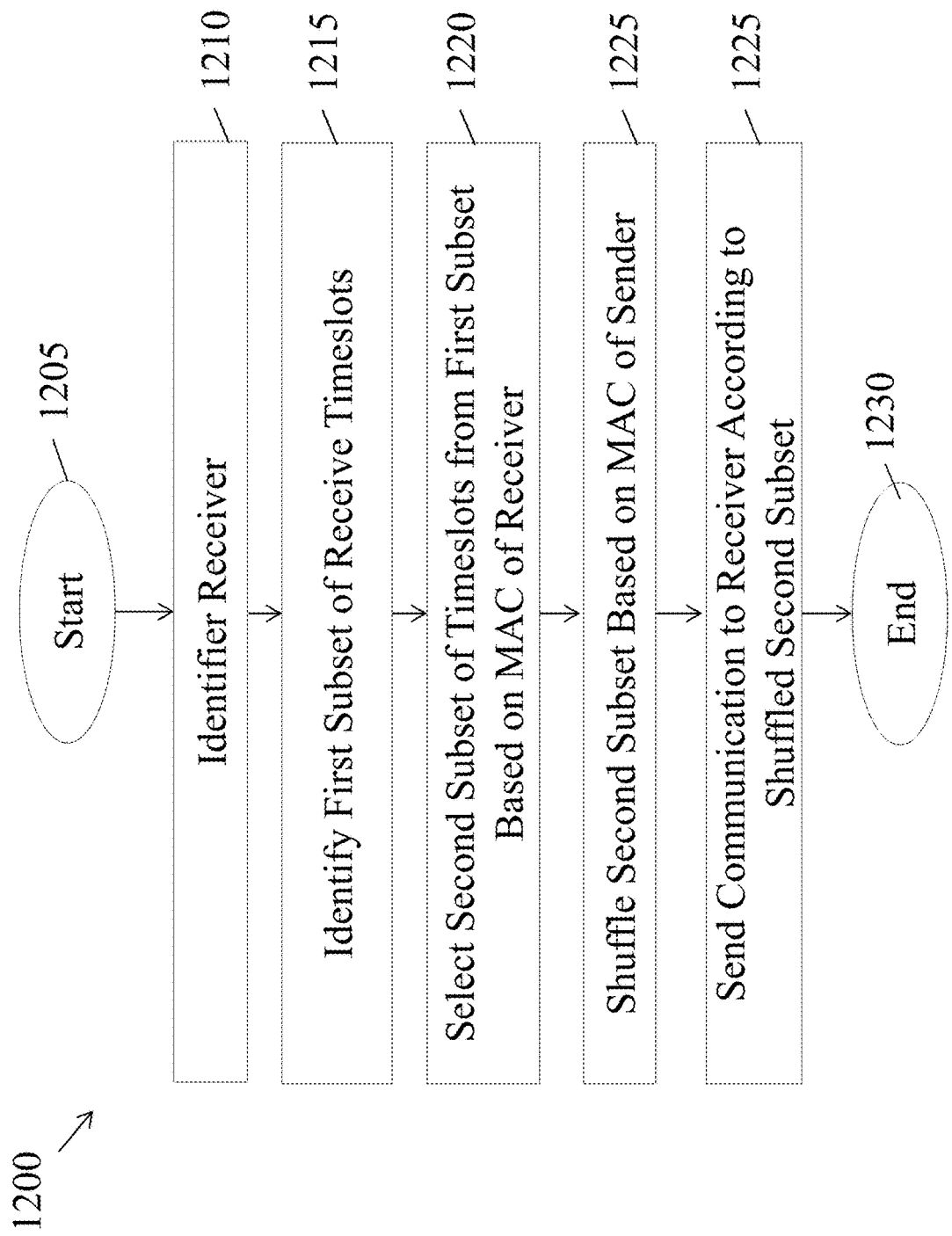
FIG. 12 illustrates an example simplified procedure for sending a communication to a receiver node.

FIG. 12 illustrates an example simplified procedure for assigning timeslots to a receiver in a network, in a network in accordance with one or more embodiments described herein. For example, a non-generic, specifically configured sender node (e.g., device 200) may perform procedure 1200 by executing stored instructions (e.g., process 248). The procedure 1200 may start at operation 1205, and continues to operation 1210, where, as described in greater detail above, the sender node may identify a neighboring receiver node to which the sender node is to send a communication. For example, the neighboring receiver node may be a parent or child of the sender node, according to a routing topology.

At operation 1215, as detailed above, the sender node may identify a first subset of receive timeslots in a slotframe of a communication schedule associated with the receiver node. In various embodiments, the first subset of receive timeslots correspond to send timeslots associated with the sender node. In other words, out of the M-number of timeslots of the slotframe, the sender node may identify the subset of these timeslots in which the sender node is allowed to transmit and correspond to timeslots in which the receiver node is allowed to receive communications from the sender node. In some embodiments, the size of the first subset of receive timeslots may be a function of the depth of the sender node in the routing topology of the network (e.g., hop distance to the network root, etc.).

At operation 1220, the sender node may select a second subset of receive timeslots from the first subset based in part on a media access control (MAC) address of the receiver node, as described in greater detail above. In various embodiments, the MAC address of the receiver node can be used as a seed value to pseudo-randomly select P-number of timeslots from the first set of timeslots. If the receiver does not know the value of P, the receiver may instead use a predefined, minimum number of timeslots, $P_{min}$.

At operation 1225, as detailed above, the sender node may shuffle the second subset of receive timeslots based on a MAC address of the sender node. In various embodiments, the sender node may achieve this shuffling by pseudo-randomly shuffling the timeslots in an array, using the MAC address of the sender node as a seed value. In doing so, the indices of the timeslots of the second subset are reordered such that they're statistically spread out across the timespan of the slotframe.

At operation 1230, the sender node sends the communication to the receiver node according to the shuffled second subset of receive timeslots. As would be appreciated, the time-spreading that results from shuffling the second set of timeslots helps to avoid collisions between the sender node and any other nodes attempting to communicate with the receiver node at the same time. Procedure 1200 then ends at operation 1235.

Figure 13A:
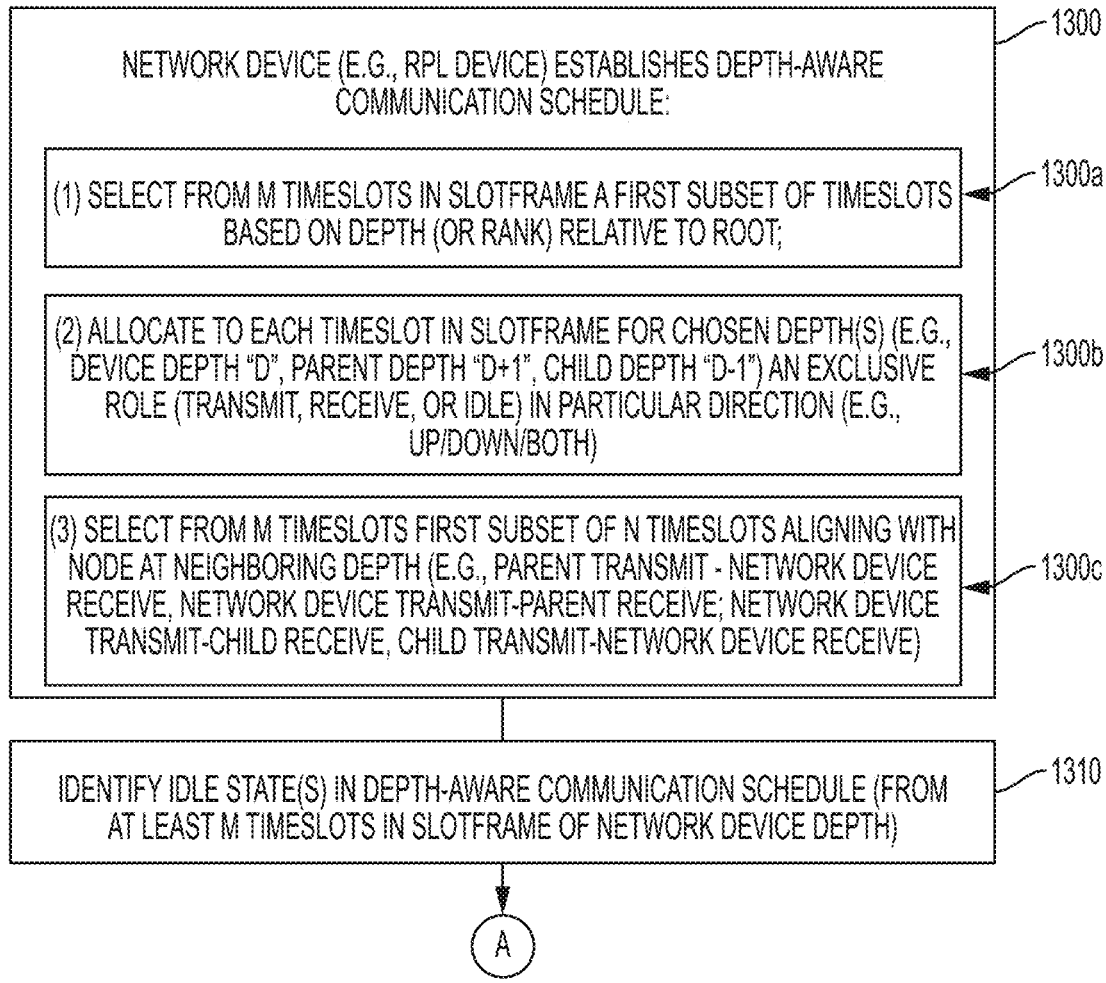
FIGS. 13A-13B illustrate an example method summarizing selecting in-case-of-emergency timeslots, and selectively transmitting a prioritized data packet in an allocated in-case-of-emergency timeslot, according to an example embodiment.
Figure 13B:
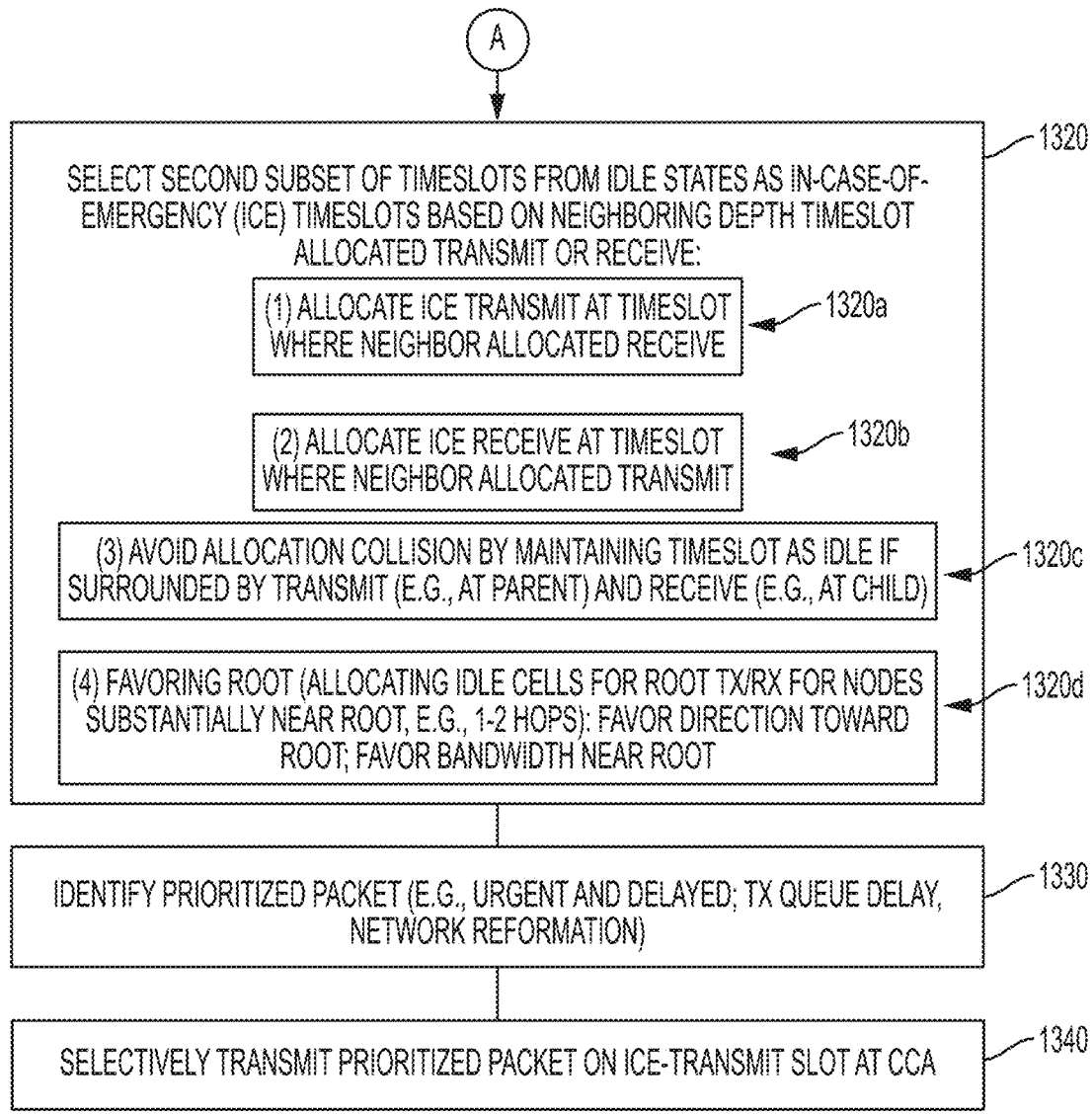

In-Case-of-Emergency (ICE) Timeslot Allocation for Emergency Packet Transmission FIGS. 13A-13B illustrate an example method summarizing a network device 200 selecting in-case-of-emergency timeslots, and selectively transmitting a prioritized data packet in an allocated in-case-of-emergency timeslot, according to an example embodiment.

The processor circuit 220 of any network device 200 (e.g., any root device or non-root network device in a tree-based topology such as a DAG) is configured for establishing at operation 1300, as detailed above (e.g., with respect to FIGS. 9A-E), at least a portion of a depth-aware communication schedule (e.g., 1000 of FIG. 10A) for one or more nodes (i.e., network devices) in a data network 100 that comprises the root node/device (e.g., "FAR-1" of FIG. 1) and non-root nodes/devices (e.g., "11", "12", "22", "23", "31" through "34", "41" through "44"). As described previously, each non-root node in the routing topology (e.g., 400 of FIG. 4) has an associated depth (e.g., D1 through D7 of FIG. 10A) relative to the root node.

The processor circuit 220 of any network device 200 is configured for selecting in operation 1300a, as detailed above, a first subset (e.g., 906 of FIG. 9A) of timeslots from M timeslots in a slotframe (e.g., 902 of FIG. 9A) of the depth-aware communication schedule based on the depth of a particular node. The processor circuit 220 of any network device 200 is configured for allocating to each timeslot in the first subset, in operation 1300b as detailed above, an exclusive role for one or more of the nodes at the corresponding depth, where the exclusive role includes one of a transmit operation, a receive operation, or an idle state.

The processor circuit 220 of any network device 200 is configured for selecting in operation 1300c, as detailed above (e.g., in FIG. 10C), the first subset of N timeslots that align with another network node at a neighboring depth, for example the processor circuit 220 of a network device 200 (e.g., at depth D1) can identify that for a given timeslot (e.g., timeslot 1) its parent (e.g., the root) has a transmit slot that aligns with a receive slot of the network device 200; alternately, the network device 200 can identify that for a given timeslot its parent has a receive slot that aligns with a transmit slot of the network device 200.

The processor circuit 220 of any network device 200 is configured for identifying in operation 1310, as detailed above, one or more of the idle states in the depth-aware communication schedule (e.g., listed as "idle" in the schedule 1000 of FIG. 10A), at least from the M timeslots in the slotframe associated with the depth of the network device 200. As described previously, the idle timeslots can be considered as wasted bandwidth in cases where priority messages or critical messages need to be propagated throughout the data network.

Referring to FIG. 13B, the processor circuit 220 of any network device 200 in operation 1320, as detailed above, is configured for identifying and selecting a second subset of timeslots from the one or more idle states as in-case-of-emergency timeslots (e.g., "xmit ICE" or "rcv ICE", illustrated in FIG. 10B) based on the processor circuit 220 identifying for each of the timeslots in the second subset a corresponding timeslot at a neighboring depth being allocated a corresponding transmit operation or receive operation. For example, in operation 1320a a network device 200 at depth D4 can allocate an in-case-of-emergency (ICE) transmit timeslot ("xmit ICE") at a corresponding timeslot (e.g. at timeslot 1) that has a neighboring depth (e.g., depth D5 at timeslot 1) that is allocated a receive operation (e.g., "rcv down"); similarly, in operation 1320b a network device 200 at depth D7 can allocate an in-case-of-emergency receive timeslot ("rcv ICE") at a corresponding timeslot (e.g., at timeslot 1) having at a neighboring depth (e.g., depth D6 at timeslot 1) allocated a transmit operation (e.g., "xmit up").

The processor circuit 220 of any network device 200 in operation 1320c also is configured for avoiding any allocation collision based on selecting the second subset of timeslots based on maintaining one of the idle states (e.g., at D3 at timeslot 4 or at D4 in timeslot 5 of FIG. 10B) in response to determining the one idle state (e.g., D3 at timeslot 4) is surrounded by a transmit operation at a first neighboring depth (e.g., D3 at timeslot 4 is adjacent to "xmit down" at depth D4) and a receive operation at a second neighboring depth (e.g., D3 at timeslot 4 is adjacent to "rcv up" at depth D2).

The processor circuit 220 of any network device 200 in operation 1320d (or at least the network devices substantially near the root, such as the root device, and the network devices at depth D1 and D2), can be configured for selecting the second subset based on at least one of prioritizing allocation of in-case-of-emergency (ICE) timeslots for directed transmission toward the root node for a prioritized data packet required by the root node; or prioritizing allocation of ICE timeslots, for nodes substantially near the root node, for prioritized allocation of bandwidth between the root node and the nodes substantially near the root node. As illustrated in FIG. 10B, a second order optimization can be achieved in order to augment bandwidth near the root, where all timeslots at the root level are allocated with non-idle operations, such that the timeslots 2 and 4 for the root are in FIG. 10B are allocated (e.g., by the root network device 200) as "rcv ICE" timeslots, and the timeslot 5 for the root in FIG. 10B is allocated (e.g., by the root network device 200) as "xmit ICE", and network devices at depth D1 can re-allocate timeslots 2 and 4 as "transmit both", and timeslot 5 as "rcv ICE". Prescribed rules can be installed within the root network devices and the non-root network devices substantially near the root (e.g., depths D1 and D2) that enable the network devices to ensure consistent allocation of ICE timeslots.

Hence, each network device 200 can select in-case-of-emergency (ICE) timeslots from existing idle timeslots, enabling prioritized packets to be transmitted, where the prioritization can be based on a network administrator policy decision that transmission of a prioritized packet by a given network device warrants a risk of collision with a neighboring network device (within the same interference domain as the given network device). As described previously, the depth aware communication schedule provides available timeslots for transmission or reception, however, no transmission will occur at a given transmit-allocated timeslot unless a network device at the associated depth has a data packet to transmit and the network device as decided to transmit at the given transmit-allocated timeslot (as opposed to another timeslot due to destination MAC address or source MAC address, for example). Hence, depending on Quality of Service requirements, a network administrator can identify certain traffic classes that warrant a risk of collision.

For example, processor circuit 220 of any network device 200 in operation 1330, as detailed above, is configured for identifying a received data packet as requiring transmission as a prioritized data packet based on prescribed QoS rules. For example, processor circuit 220 is configured for identifying a received data packet as requiring transmission as prioritized data packet based on the processor circuit determining that the received data packet is an "exceptional and valuable" traffic packet encountering a delay relative to a prescribed latency, for example based on determining that a packet requiring a 1 second-per-hop maximum latency has already suffered a latency of 3 seconds over two hops (resulting in a one-second delay); the processor circuit 220 also can determine that a received data packet is encountering a transmit queue delay in the device interface circuit 210; the processor circuit 220 also can determine that a received data packet network protocol packet is associated with reformation of the routing topology, for example a DIO message or DAO message according to RPL.

Hence, the processor circuit 220 can cause the device interface circuit 210 in operation 1340 to transmit the prioritized data packet in the allocated in-case-of-emergency timeslot. In one example embodiment, the processor circuit 220 in operation 1340 is configured for setting, for each in-case-of emergency timeslot 1410, a corresponding wait interval (1400 of FIG. 14) within an ICE timeslot 1410 before initiation of the corresponding transmit operation or receive operation, that is less than a corresponding wait interval 1420 for a non-priority data packet in a non-priority transmit slot 1430, according to an example embodiment.

Figure 14:
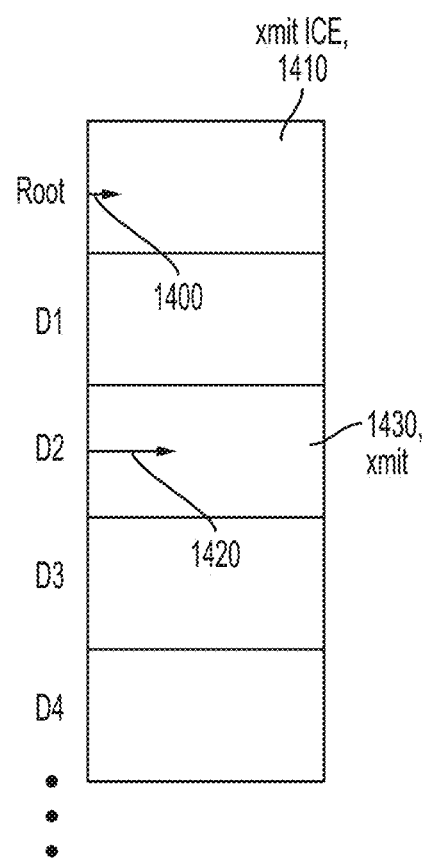
FIG. 14 illustrates an example setting of a wait interval within an in-case-of-emergency timeslot that is less than a corresponding wait interval for a non-priority data packet, according to an example embodiment.

As illustrated in FIG. 14 the ICE wait interval 1400 for the ICE timeslot 1410 is less than the corresponding CCA wait interval 1420 for the non-priority transmit timeslot 1430. Hence, even if the Root needs to use an "xmit ICE" timeslot and a network device at depth D2 needs to transmit a data packet at timeslot 5 of FIG. 10B, the root network device waits for the wait interval 1400 before transmitting its priority packet; in contrast, the network device at depth D2 needs to wait at least the wait interval 1420 before any transmissions, and therefore can defer in response to detecting the transmission by the root network device following the wait interval 1400. Note that the network device at depth D2 merely needs to detect transmission energy during the wait interval 1420 to defer, and does not need to be able to decoded the priority data packet transmitted at timeslot 5 by the root network device.

According to example embodiments, idle channels in a depth-aware communication schedule can be used for priority traffic, where a remote risk of collision is deemed an acceptable risk for transmitting a prioritized data packet. The identification of idle channels can be from a depth-aware communication schedule determined by a transmitting or receiving network device; the identification of idle channels also can be from a depth-aware communication schedule that is determined by another remote network device, for example a 6TiSCH PCE. Further, the use of CCA having a priority wait interval that is less than a non-priority wait interval (associated with a non-priority data packet) ensures that a neighboring node (within the interference domain of the network device executing ICE transmission of the priority data packet) does not interfere with the ICE transmission of the prioritized data packet, ensuring collision is avoided between prioritized data packets and non-priority data packets.

It should be noted that while certain steps or operations within the procedures described herein may be optional as described above, the operations described herein are merely examples for illustration, and certain other operations or steps may be included or excluded as desired. Further, while a particular order of the steps is shown, this ordering is merely illustrative, and any suitable arrangement of the steps may be utilized without departing from the scope of the embodiments herein. Moreover, while the operations described herein might be described separately, certain steps from each procedure may be incorporated into each other procedure, and the procedures are not meant to be mutually exclusive.

The techniques described herein, therefore, allow for communications in a shared media network (e.g., wireless, etc.) to be distributed across both frequency and time, to avoid collisions and help reduce power consumption by nodes. In some aspects, the timeslots of a given node may be a function of the depth of the node in the routing topology of the network, such as the hop distance from the node to the root of the network. In further aspects, the MAC addresses of the sender and receiver can be used to pseudo-randomly spread the timeslots used for communication between the sender and receiver across time. Moreover, identified idle slots that normally would result in wasted bandwidth can be statistically reused in cases of emergency for prioritized data packets, enabling a balanced risk assessment between a risk of collision between neighboring nodes and a necessity of transmitting the prioritized data packets.

While there have been shown and described illustrative embodiments that provide for the time multiplexed channel hopping for LLNs and other networks, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless).

In addition, while certain protocols are shown, such as RPL and 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    establishing, by a network device, a depth-aware communication schedule for one or more nodes in a data network having a routing topology comprising a root node and each node in the routing topology having an associated depth relative to the root node, the establishing including selecting from a slotframe of the depth-aware communication schedule a first subset of timeslots based on the depth of a particular node, and allocating to each timeslot in the first subset an exclusive role for one or more of the nodes at the corresponding depth, the exclusive role including one of a transmit operation, a receive operation, or an idle state;
    identifying, by the network device, one or more of the idle states in the depth-aware communication schedule;
    selecting, by the network device, a second subset of timeslots from the one or more idle states as in-case-of-emergency timeslots, based on the network device identifying for each of the timeslots in the second subset a corresponding timeslot at a neighboring depth being allocated a corresponding transmit operation or receive operation; and
    causing, by the network device, selective transmission of a prioritized data packet in an allocated in-case-of-emergency timeslot.

2. The method of claim 1, wherein the selecting of the second subset includes:
    allocating an in-case-of-emergency (ICE) transmit timeslot at a corresponding timeslot having at a neighboring depth allocated a receive operation; and
    allocating an ICE receive timeslot at a corresponding timeslot having at a neighboring depth allocated a transmit operation.

3. The method of claim 2, wherein the selecting of the second subset includes maintaining one of the idle states in response to determining the one idle state is surrounded by a transmit operation at a first neighboring depth and a receive operation at a second neighboring depth.

4. The method of claim 1, wherein the selecting of the second subset of timeslots includes at least one of:
   prioritizing allocation of in-case-of-emergency (ICE) timeslots for directed transmission toward the root node for a prioritized data packet required by the root node; or
   prioritizing allocation of ICE timeslots, for nodes substantially near the root node, for prioritized allocation of bandwidth between the root node and the nodes substantially near the root node.

5. The method of claim 1, wherein the causing includes:
   identifying a received data packet as requiring transmission as the prioritized data packet; and
   transmitting the prioritized data packet in the allocated in-case-of-emergency timeslot.

6. The method of claim 5, wherein the received data packet is identified as requiring transmission as the prioritized data packet based on determining the received data packet is one of an exceptional and valuable traffic packet encountering a delay relative to a prescribed latency, determining the received data packet is encountering a transmit queue delay, or a determining the received data packet network protocol packet associated with reformation of the routing topology.

7. The method of claim 1, further comprising setting, for each in-case-of emergency timeslot, a corresponding wait interval before initiation of the corresponding transmit operation or receive operation that is less than a second wait interval used for non-priority transmission.

8. An apparatus comprising:
   a processor circuit configured for establishing a depth-aware communication schedule for one or more nodes in a data network having a routing topology comprising a root node and each node in the routing topology having an associated depth relative to the root node, the processor circuit configured for selecting from a slotframe of the depth-aware communication schedule a first subset of timeslots based on the depth of a particular node, and allocating to each timeslot in the first subset an exclusive role for one or more of the nodes at the corresponding depth, the exclusive role including one of a transmit operation, a receive operation, or an idle state;
   the processor circuit further configured for identifying one or more of the idle states in the depth-aware communication schedule, and selecting a second subset of timeslots from the one or more idle states as in-case-of-emergency timeslots, based on the processor circuit identifying for each of the timeslots in the second subset a corresponding timeslot at a neighboring depth being allocated a corresponding transmit operation or receive operation; and
   a device interface circuit configured for causing selective transmission of a prioritized data packet in an allocated in-case-of-emergency timeslot.

9. The apparatus of claim 8, wherein the processor circuit is configured for selecting the second subset based on:
   allocating an in-case-of-emergency (ICE) transmit timeslot at a corresponding timeslot having at a neighboring depth allocated a receive operation; and
   allocating an ICE receive timeslot at a corresponding timeslot having at a neighboring depth allocated a transmit operation.

10. The apparatus of claim 8, wherein the processor circuit is configured for selecting the second subset based on maintaining one of the idle states in response to determining the one idle state is surrounded by a transmit operation at a first neighboring depth and a receive operation at a second neighboring depth.

11. The apparatus of claim 8, wherein the processor circuit is configured for selecting the second subset based on at least one of:
   prioritizing allocation of in-case-of-emergency (ICE) timeslots for directed transmission toward the root node for a prioritized data packet required by the root node; or
   prioritizing allocation of ICE timeslots, for nodes substantially near the root node, for prioritized allocation of bandwidth between the root node and the nodes substantially near the root node.

12. The apparatus of claim 8, wherein the causing includes:
   identifying a received data packet as requiring transmission as the prioritized data packet; and
   transmitting the prioritized data packet in the allocated in-case-of-emergency timeslot.

13. The apparatus of claim 8, wherein the processor circuit is configured for identifying the received data packet as requiring transmission as the prioritized data packet based on the processor circuit determining the received data packet is one of an exceptional and valuable traffic packet encountering a delay relative to a prescribed latency, determining the received data packet is encountering a transmit queue delay, or a determining the received data packet network protocol packet associated with reformation of the routing topology.

14. The apparatus of claim 8, wherein the processor circuit is configured for setting, for each in-case-of emergency timeslot, a corresponding wait interval before initiation of the corresponding transmit operation or receive operation that is less than a second wait interval used for non-priority transmission.

15. One or more non-transitory tangible media encoded with logic for execution by a machine and when executed by the machine operable for:
   establishing, by the machine implemented as a network device, a depth-aware communication schedule for one or more nodes in a data network having a routing topology comprising a root node and each node in the routing topology having an associated depth relative to the root node, the establishing including selecting from a slotframe of the depth-aware communication schedule a first subset of timeslots based on the depth of a particular node, and allocating to each timeslot in the first subset an exclusive role for one or more of the nodes at the corresponding depth, the exclusive role including one of a transmit operation, a receive operation, or an idle state;
   identifying, by the network device, one or more of the idle states in the depth-aware communication schedule;
   selecting, by the network device, a second subset of timeslots from the one or more idle states as in-case-of-emergency timeslots, based on the network device identifying for each of the timeslots in the second subset a corresponding timeslot at a neighboring depth being allocated a corresponding transmit operation or receive operation; and
   causing, by the network device, selective transmission of a prioritized data packet in an allocated in-case-of-emergency timeslot.

16. The one or more non-transitory tangible media of claim 15, wherein the selecting of the second subset includes:

allocating an in-case-of-emergency (ICE) transmit timeslot at a corresponding timeslot having at a neighboring depth allocated a receive operation; and allocating an ICE receive timeslot at a corresponding timeslot having at a neighboring depth allocated a transmit operation.

17. The one or more non-transitory tangible media of claim 16, wherein the selecting of the second subset includes maintaining one of the idle states in response to determining the one idle state is surrounded by a transmit operation at a first neighboring depth and a receive operation at a second neighboring depth.

18. The one or more non-transitory tangible media of claim 15, wherein the selecting of the second subset of timeslots includes at least one of:

prioritizing allocation of in-case-of-emergency (ICE) timeslots for directed transmission toward the root node for a prioritized data packet required by the root node; or prioritizing allocation of ICE timeslots, for nodes substantially near the root node, for prioritized allocation of bandwidth between the root node and the nodes substantially near the root node.

19. The one or more non-transitory tangible media of claim 15, wherein the causing includes:

identifying a received data packet as requiring transmission as the prioritized data packet; and transmitting the prioritized data packet in the allocated in-case-of-emergency timeslot;

wherein the received data packet is identified as requiring transmission as the prioritized data packet based on determining the received data packet is one of an exceptional and valuable traffic packet encountering a delay relative to a prescribed latency, determining the received data packet is encountering a transmit queue delay, or a determining the received data packet network protocol packet associated with reformation of the routing topology.

20. The one or more non-transitory tangible media of claim 15, further operable for setting, for each in-case-of-emergency timeslot, a corresponding wait interval before initiation of the corresponding transmit operation or receive operation that is less than a second wait interval used for non-priority transmission.

* * * * *